(12) United States Patent
Le Taillandier De Gabory et al.

(10) Patent No.: US 8,971,723 B2
(45) Date of Patent: Mar. 3, 2015

(54) METHOD OF AND SYSTEM FOR DETECTING SKEW BETWEEN PARALLEL SIGNALS

(75) Inventors: Emmanuel Le Taillandier De Gabory, Tokyo (JP); Kiyoshi Fukuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 728 days.

(21) Appl. No.: 13/262,149

(22) PCT Filed: Apr. 16, 2009

(86) PCT No.: PCT/JP2009/058036
§ 371 (c)(1),
(2), (4) Date: Sep. 29, 2011

(87) PCT Pub. No.: WO2010/119576
PCT Pub. Date: Oct. 21, 2010

(65) Prior Publication Data
US 2012/0020660 A1    Jan. 26, 2012

(51) Int. Cl.
*H04J 3/00*     (2006.01)
*H04B 10/077*   (2013.01)
*H04L 25/14*    (2006.01)
*H04J 14/04*    (2006.01)
*H04J 14/02*    (2006.01)
(Continued)

(52) U.S. Cl.
CPC ............ *H04B 10/0775* (2013.01); *H04L 25/14* (2013.01); *H04J 14/04* (2013.01); *H04J 14/02* (2013.01); *H04L 7/0075* (2013.01); *H04J 3/0658* (2013.01)
USPC ............................... 398/182; 398/208; 398/45

(58) Field of Classification Search
USPC ............................................ 398/182, 208, 45
See application file for complete search history.

(56) References Cited

U.S. PATENT DOCUMENTS

| 7,292,608 B1 | 11/2007 | Nowell et al. |
| 2002/0181062 A1 | 12/2002 | Graves et al. |
| 2007/0286612 A1 | 12/2007 | Kuwata et al. |

FOREIGN PATENT DOCUMENTS

| GB | 2280560 A | 2/1995 |
| JP | 10-257037 A | 9/1998 |
| JP | 11341102 A | 12/1999 |

(Continued)

OTHER PUBLICATIONS

International Preliminary Report on Patentability (PCT/IB/373 & PCT/ISA/237 forms) dated Oct. 18, 2011, from the International Searching Authority in counterpart application No. PCT/JP2009/058036.

(Continued)

*Primary Examiner* — Danny Leung
(74) *Attorney, Agent, or Firm* — Sughrue Mion, PLLC

(57) ABSTRACT

A method is provided for detecting the skew between parallel light signals generated from a serial data stream. The method can be used with polarization multiplexed signal, as well as with wavelength division multiplexed signals, spatial division multiplexed signals, phase modulated signals, or intensity modulated signals. The method can be used with direct detection schemes as well as with coherent detection schemes. The method is provided with: imprinting dips between a fixed number of transmitted symbols of the parallel signals; detecting an electrical signal related to the dips for each parallel signal; and comparing the electrical signals in delay.

20 Claims, 18 Drawing Sheets

(51) Int. Cl.
  *H04L 7/00* (2006.01)
  *H04J 3/06* (2006.01)

(56) References Cited

FOREIGN PATENT DOCUMENTS

| JP | 2003218844 A | 7/2003 |
|---|---|---|
| JP | 2004193817 A | 7/2004 |
| JP | 2007329870 A | 12/2007 |
| JP | 2010118842 A | 5/2010 |

OTHER PUBLICATIONS

Office Action dated Jan. 17, 2013 issued by the Japanese Patent Office in counterpart Japanese Application No. 2011-544708.
R. Noe, "PLL-Free Synchronous QPSK Polarization Multiplex/Diversity Receiver Concept With Digital I&Q baseband Processing", IEEE Photonics Technologies Letters, vol. 17, No. 4, Apr. 2005, pp. 887-889.
Kaneda, et al., "Coherent Polarization-Division-Multiplexed QPSK Receiver With Fractionally Spaced CMA for PMD Compensation", IEEE Photonics Technology Letters, vol. 21, No. 4, Feb. 15, 2009, pp. 203-205.
Savory, et al., "Ultra Long-Haul QPSK Transmission using a Digital Coherent Receiver", MA3.1 (Invited), pp. 13-14.
Tomizawa, et al., "Terabit LAN wit optical virtual concatenation for Grid applications with super-computers", OThG6, 3 pgs total.
Ito, et al., "Comparison of 100Gb/s transmission performances between RZ-DQPSK and polarization multiplexed NRZ/RZ-DPSK with automatic polarization de-multiplexer", JThA46.pdf, OFC/NFOEC 2008, 3 pgs. total.
Ito, et al., "Precise Analysis of Transmission Impairments of Pol-Mux 110Gb/s RZ-DQPSK with Automatic Pol-Dmux using Straight 2,000-km SMF Line", ECOC, vol. 3, Sep. 21-25, 2008, pp. 61-62.
Myer, et al., "Timing Adjustment by Interpolation", Digital Communication Receivers: Synchroni, 1998, pp. 505-532.
Togneri, et al., "All Optical Bit Parallel Transmission Systems", Proceedings SBMO/IEEE MTT-S IMOC 2003, pp. 367-372.
Adamczyk, et al., "Coarse and Fine Bit Synchronization for WDM Interconnections Using Two Subcarrier-Multiplexed Control Pilot Tones", IEEE Photonics Technology Letters, vol. 11, No. 8, Aug. 1999, pp. 1057-1059.

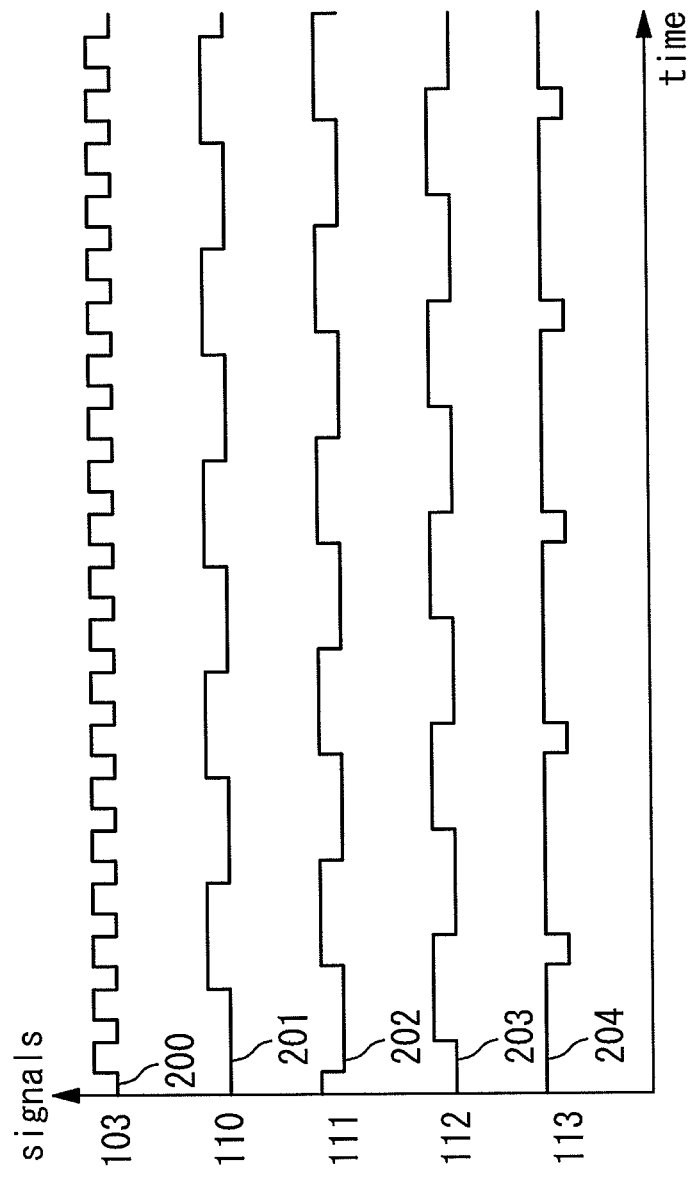

Fig. 3A
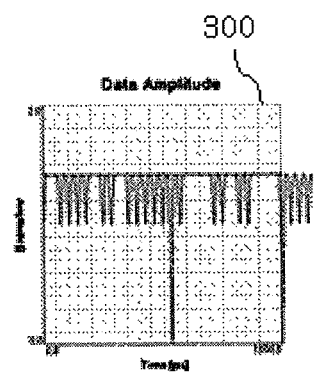
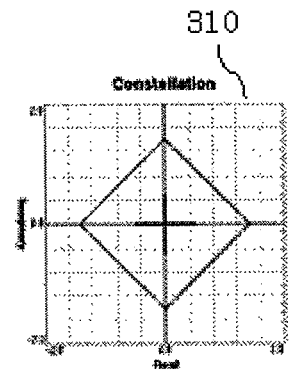
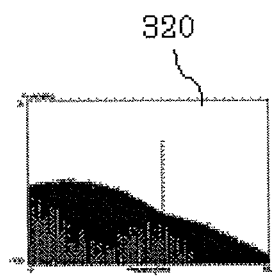
Fig. 3B
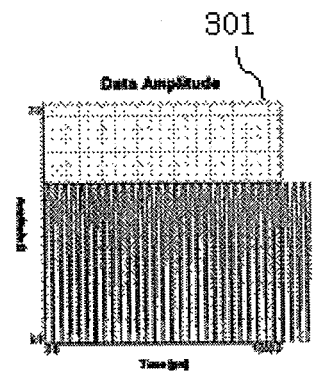
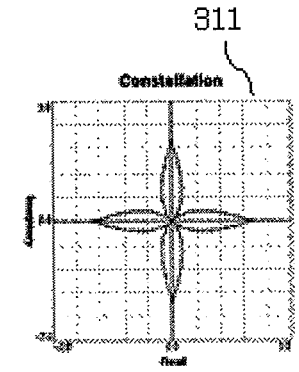
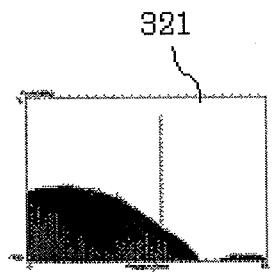

Fig. 3C
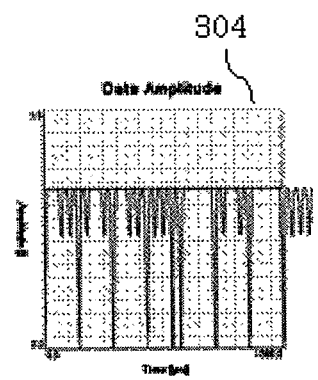
304
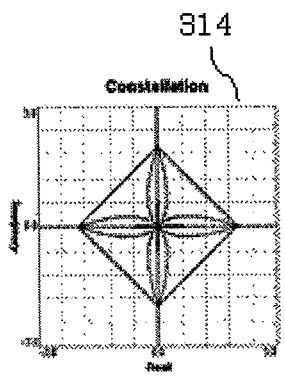
314
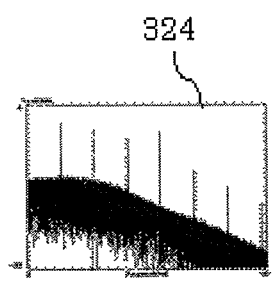
324
Fig. 3D
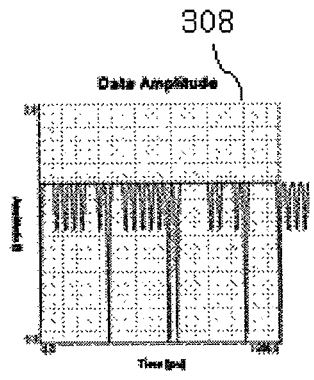
308
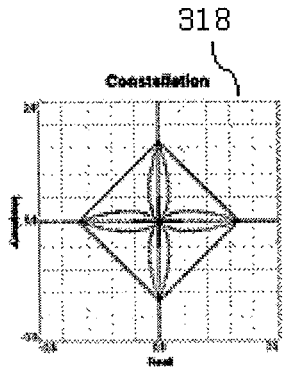
318
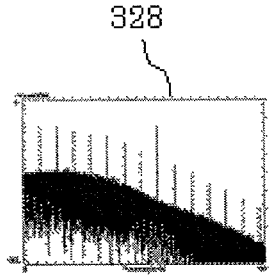
328

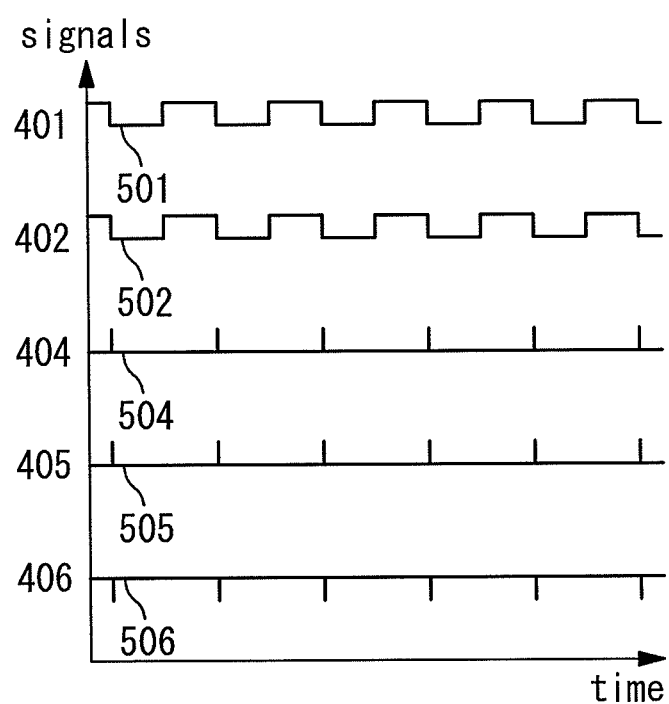

METHOD OF AND SYSTEM FOR DETECTING SKEW BETWEEN PARALLEL SIGNALS

CROSS REFERENCE TO RELATED APPLICATION

This application is a National Stage of International Application No. PCT/JP2009/058036 filed on Apr. 16, 2009, the contents of all of which are incorporated herein by reference in their entirety.

TECHNICAL FIELD

The present invention relates generally to an optical communication technique, and more particularly to parallel communications, in which one signal at a high bit rate is split and transmitted through parallel channels at lower bit rates, and is reconfigured from the transmitted parallel channels.

BACKGROUND ART

Through Serial to Parallel conversion, a serial high bit rate channel is split into lower bit rate channels, in order to transmit them as parallel channels between a same transmission start point to a same transmission stop point, while the parallel channels do not have any crosstalk ideally. The parallel channels are then serialized into a high bit rate channel, which contains the transmitted information of the original serial channel. This makes it possible to decrease the effect of distortions and impairments appearing during the transmission, whose effects increase with the bit rate. It also makes it possible to reduce the spectrum width of transmitted signals because the parallel channels have a lower bit rate than the serial channel.

Known ways to implement parallel transmissions include: Polarization Multiplexing (PM), in which two signals are transmitted through the same medium by two signals having orthogonal polarizations; Wavelength Division Multiplexing (WDM), in which the parallel channels are transmitted through the same medium by different optical carriers having different wavelengths; Space Division Multiplexing (SDM), in which the parallel channels are transmitted through different mediums, which can be bounded such as a fiber ribbon; combinations of the previous multiplexing formats.

PM is recognized as an efficient way to double a transmitted data rate of an optical transmissions system as it makes it possible to carry two light signals on orthogonal polarizations of an optical fiber used as transmission medium. Both of the signals ideally do not interfere as the polarizations are orthogonal. Therefore, it is a way to improve the efficiency of the use of bandwidth of the optical fiber. As the bit rate of a total transmitted signal is doubled, whereas the baud rate of each polarization signal is unchanged, the width of the optical spectrum is unchanged. Therefore, PM does not degrade a tolerance to optical filtering occurring on the path of the light signal transmitted inside a network when compared with one single polarization, although a double of information is transmitted. However, polarization demultiplexing is required in order to recover each of the polarization multiplexed signals. One example of PM is given in "Precise Analysis of Transmission Impairments of Pol-Mux 110 Gb/s RZ-DQPSK with Automatic Pol-Dmux using Straight 2,000-km SMF Line" (ECOC 2008, paper We.1.E.6) by T. Ito and al.

One known method to implement PM is to provide two transmitters emitting the same wavelength and then to rotate the polarization of the signal emitted from one transmitter before combining it with the signal emitted from the other transmitter, so that both polarization are orthogonal to each other. Typically, the optical transmitters used in optical transmission systems are provided with a laser source emitting a continuous wave optical carrier signal and an optical modulator. The light carrier signal emitted from a laser source is linearly polarized; the laser source and the optical modulator are connected by a polarization maintaining fiber. Therefore, the light signal emitted from the transmitter is linearly polarized. In this configuration, rotating the polarization in one transmitter can be performed by a polarization controller or simply by rotating one axis of the polarization maintaining fiber carrying the light signal. A light signal resulting from a combination of the light signals emitted from two transmitters in this configuration is polarization multiplexed.

An alternative implementation method consists of using a same light source for both of the polarizations. A polarization maintaining coupler can be used to split a light carrier signal emitted from the laser source and each of the signals split by the coupler can be fed to an optical modulator. The polarization rotating scheme and combining scheme are identical to the above-mentioned implementation.

A binary data stream to be transmitted with the light signal may be pre-coded and de-serialized into tributary binary data streams; each of the tributary streams may be allocated to one driver, which generates a voltage used to drive an optical modulator imprinting the information to the light signal of one of the multiplexed polarizations. The multiplexed polarizations may be randomly and dynamically rotated while the light signal is transmitted through the fiber, although they remain orthogonal. Therefore, a dynamic polarization de-multiplexing scheme is useful on the receiver side.

One implementation of polarization demultiplexing can be qualified of optical polarization demultiplexing. It consists of rotating both of the multiplexed polarizations by a polarization controller so that they can be split by a polarization beam splitter or another polarization separating device. The polarization controller can be actively controlled so that the beam splitter correctly separate the polarization multiplexed signals, even when the polarizations are rotated while being transmitted through the optical fiber. Each of the separated polarizations is received by a separate optical receiver, which decodes the data of the light signal and converts it into a binary data stream. Electrical signals resulting from both of receivers are then serialized and the resultant binary data stream may be decoded. This is described in "Comparison of 100 Gb/s transmission performances between RZ-DQPSK and polarization multiplexed NRZ/RZ-DPSK with automatic polarization de-multiplexer" (OFC 2008, paper JThA46) by T. Ito and al.

An alternative method of performing polarization demultiplexing can be qualified of digital polarization demultiplexing. A light signal is received by a coherent receiver. The resultant lightwave signals can be converted into digital signals by analog to digital converters (ADCs). The resultant digital data can be calculated in accordance with appropriate algorithms that can retrieve and separate the data imprinted on each multiplexed polarization. The retrieved data streams are then decoded and serialized. One example is given in "PLL-Free Synchronous QPSK Polarization Multiplex/Diversity Receiver Concept with Digital I&Q Baseband Processing" (Photonics Technology Letters, Vol. 17, No. 4, April 2005) by R. Noe.

The binary data stream before serial-to-parallel conversion, emission and transmission through polarization multiplexed light signals and the binary data stream after polarization demultiplexing, reception and parallel-to-serial conversion are ideally identical. Differences between the streams are transmission errors. One data bit will be de-serialized and then allocated to the optical modulator imprinting data on the light signal of one polarization. This data will travel electrically from the de-serializer to the optical modulator, and then it will be transmitted optically from the modulator to an optical polarization combiner. This bit will be transmitted through a medium and received by a receiver. Another data bit of the serial data stream will be de-serialized in the same way but it will be allocated to the optical modulator imprinting data on the light signal of the other polarization. This other bit of data will travel electrically from the de-serializer to the other optical modulator, and then it will be transmitted optically from the other modulator to the optical polarization combiner. This other bit will be transmitted through the medium and received by a receiver. Therefore, both of the considered bits will travel on different electrical paths from the de-serializer to their optical modulators and on different optical paths from their modulators to the polarization combiner.

Differences in electrical or optical path lengths for the considered bits results in time difference for the transmission on the multiplexed polarizations. This problem is known as intra-channel skew. If the skew is more than half a symbol period of the signal transmitted on one polarization, the bits travelling through the longer path will arrive to the serializer in the receiver with a delay of more than one bit when compared to the bits travelling through the shorter path. This situation results in a change of the bit sequence during the transmission, i.e. in a transmission error.

Assuming 100 Gbit/s Dual Polarization Quadrature Phase Shift Keying (QPSK) transmission, the bit rate of the serial binary data stream is 100 Gbit/s but the symbol rate of the transmitted light signal is 25 Gbaud. Therefore, the symbol period of the light signal on one polarization is 40 ps. This corresponds roughly to the length tolerance of 4 mm of optical fiber for the optical path or 4 mm of wire for the electrical path. Considering the fact that the optical components for each polarization paths are usually connected by spliced fiber, such a tolerance may be hard to achieve on production. Moreover, Differential Group Delay (DGD) accumulated on the fiber during transmission may delay one polarization compared to the other one, and therefore randomly and dynamically change the intra-channel skew.

In addition, dynamic network reconfiguration or switching may cause a value of a link skew to change dynamically. If the skew is more than half a symbol period, the transmission is not error free with respect to the received data after parallel-to-serial conversion. Therefore, there is a need for monitoring the delay between polarization multiplexed signals in order to use this information to correct this delay and achieve correct transmission of data.

Various approaches have been proposed in order to solve this problem. The most obvious one is to use the Forward Error Correction (FEC) data of the serialized received data. This enables to check if the data is correct, in which case the delay between polarizations does not need to be corrected. If the error rate is more than 0.5 or in the order of 0.5, both polarizations are likely to be delayed and one can try to change this delay by using an optical delay, electrical delay or buffer on the path of one of the data transmitted on one of the multiplexed polarizations. Using the FEC information is possible in order to correct the delay between polarizations. In case of optical polarization demultiplexing, this can be done using an optical variable delay line on the path of the light signal of the polarization to be controlled, or an electrical phase shifter or a buffer on the path of the electrical signal of the polarization to be controlled.

In case of polarization demultiplexing through digital signal processing, it is possible to place a buffer or a filter to delay the data of the polarization to be controlled, as explained in ""Digital Communication Receivers" (Wiley-Interscience Publication, 1998, p 505) by H. Meyr et al. However, in all cases, the information given by the result on the FEC frame monitoring is binary in the sense that if a delay appears, there is no information on the delay amount or on which polarization is delayed.

Therefore, correcting the delay between polarization-multiplexed signals with this method is likely to require several attempts before finding the adequate delay compensation, complicating the practical implementation. Moreover, continuous control of the delay between polarized signals is not implementable with this method. Finally, using this method requires to use the information of upper layer of the network to control physical layer parameters, which may complicate system design or hinder interoperability.

Another approach is particular to digital polarization demultiplexing. In this case, a coherent receiver is used and the resulting signals are converted from analog to digital. The converted signals are processed in order to recover the transmitted data. During the signal processing, the signals for each polarization are recovered through algorithms such as Constant Module Algorithm (C.M.A.). This is explained by N. Kaneda et al. in "Coherent Polarization-Division-Multiplexed QPSK Receiver with Fractionally Spaced CMA for PMD Compensation" (Photonics Technology Letter, Vol. 21, No. 4, Feb. 15, 2009).

Digital processing enables to process the signal through digital filters, which enables to correct some of the degradations of the signal appearing during the transmission through the medium. Filters can be updated through the recognition of training sequences used at regular interval during the transmission, as described in "Ultra Long-Haul QPSK Transmission using a Digital Coherent Receiver" (LEOS 2007) by S. J. Savory et al. Training patterns can also be used to eliminate the ambiguity on polarizations and transmitted symbols. All possibilities for the attribution of ambiguous variable are tried, until the training pattern is recognized.

In this case, buffer or time delaying filters can be used to correct the delay between polarizations until the training pattern is recognized, or the received pattern can be compared with several recognition patterns, for possible cases of delay, until there is a match, which enables to retrieve and correct the delay between polarizations. This approach requires training patterns, which are susceptible to decrease the amount of transmitted data at constant bit rate. Moreover, this method requires one comparison for each case of delay. Therefore it multiplies the calculation time and required memory by the number of cases to study. This will consummate more electrical power for the increased computation requirements.

However, there is room for improvement in simplicity, possibility of continuous control, processing power consumption, monitoring range and speed for monitoring the delay between polarization multiplexed signals.

Parallel transmission can be implemented with WDM. The parallel lower rate channels are transmitted by lightwave carrier at different wavelengths through the same medium. Each channel is emitted by a transmitter and the light of all transmitters are multiplexed into the same fiber. At the other end of the link, the wavelengths are demultiplexed according to their wavelengths; each channel is received and decoded by receivers. The electrical data from the parallel receivers are then converted from parallel to serial. Intra channel skew can appear inside the medium due to chromatic dispersion or after reception due to difference of length of the electrical path. Dynamic network management and switching can change dynamically the intra-channel skew of received signals as the transmission path is changed dynamically. With higher bit rate, the symbol period decreases, therefore the skew problem becomes critical. This is illustrated in "Terabit LAN with optical virtual concatenation for Grid applications with super-computers" by M. Tomizawa et al. (OFC 2005 OThG6).

The presented solution rectify the skew between channels is the use of the XAUI standard, which relies on channel decoding and realigning. This requires an increase of the total bit rate for the same transmitted data payload, as the prefix needed for alignment is introduced in the transmitted data. In addition, the skew monitoring requires the information of upper layer information.

There is a room for improvement in term of simplicity, efficiency of the transmitted data rate.

Another way of implementing parallel transmission is SDM. The use of fiber ribbon for SDM and the skew problem inherent to SDM is illustrated in "All Optical Bit Parallel Transmission Systems" by A. P. Togneri et al. (SMBO IEEE 2003). The link skew is due to difference in the fiber length or condition. With higher bit rates, the symbol rate transmitted through the fiber increases, meaning shorter symbol periods. Therefore the skew problem becomes critical with higher bit rates. US Patent US2000484961A discloses a method to compensate skew by decoding and realigning data. This method requires the use of prefixes, which necessitates an increase of the total bit rate for the same transmitted data payload. Moreover, this method requires the use of information from higher layers than the physical layer.

There is room for improvement in term of simplicity, efficiency of the transmitted data rate. There is a need for a fast, simple method to monitor skew between polarization parallel channels on wide skew ranges, without relying on the information of upper layers, without the presence of a training sequence or prefix.

In conjunction with the above description, Japanese Patent Application Publications (JP-P2003-218844A, JP-P2004-193817A, and JP-A-Heisei 11-341102) enable to monitor and correct the skew between parallel channels.

Japanese Patent Application Publication (JP-P2003-218844A) requires that a special pattern named PING or PONG depending on the case is added to the actual data to be transmitted. PING and PONG pattern carry no information and are used only for the purpose of skew monitoring or compensation. Therefore, to carry effectively m bits of data within the network, JP-P2003-218844A requires in fact m bits plus the number of bits contained in PING or PONG to be physically transmitted through the network. Therefore, the bandwidth of the transmitters and receivers in the network when JP-P2003-218844A is implemented has to be higher than the bandwidth necessary to carry the data. This increases the cost and complexity of receivers and can cause a degradation of the performance of the receiver. Moreover, in JP-P2003-218844A, the receiver must distinguish PING and PONG patterns from the data. Therefore, PING and PONG patterns must be composed so they cannot be mistaken for data and data must be encoded so that it cannot be mistaken for PING or PONG pattern. In addition, measuring skew between channels in JP-P2003-218844A requires that the data received is first decoded so that PING and PONG patterns can be read and compared. When errors appear due to noise or degradation of the signal transmitted through the network, this can affect read PING and PONG patterns, and therefore cause an error in the skew evaluation. As a consequence, this can have a tremendous impact on the serialized signal that FEC or other correction method may not be able to compensate. Finally, in JP-P2003-218844A, the skew is measured in shifts of bits or symbols of PING and PONG patterns transmitted through the network. This is a coarse estimation which is limited to a one symbol period resolution.

Also, Japanese Patent Application Publication (JP-P2004-193817A) requires that special patterns named I(n), where n is an integer indexing the parallel channel where the pattern is inserted, are added to the actual data to be transmitted. I(n) patterns carry no information and are used only for the purpose of skew monitoring or compensation. Therefore, to carry effectively m bits of data within the network, JP-P2004-193817A requires in fact m bits plus the number of bits contained in I(n) patterns to be physically transmitted through the network. Therefore, the bandwidth of the transmitters and receivers in the network when 2004-193817 is implemented has to be higher than the bandwidth necessary to carry the data. This increases the cost and complexity of receivers and may cause a degradation of the performance of the receiver. Moreover, in JP-P2004-193817A, the receiver must distinguish I(n) patterns from the data. Therefore, I(n) patterns must be composed so they cannot be mistaken for data and data must be encoded so that it cannot be mistaken for I(n) patterns. In addition, measuring skew between channels in JP-P2004-193817A requires that the data received is first decoded so that I(n) patterns can be read and compared. In cases where errors appear due to noise or degradation of the signal transmitted through the network, this can affect the reading of I(n) patterns, and therefore cause an error in the skew evaluation. As a consequence, this can have a tremendous impact on the serialized signal that FEC or other correction method may not be able to compensate. Finally, in JP-P2004-193817A, the skew is measured in shifts of bits or symbols of I(n) patterns transmitted through the network. This is a coarse estimation which is limited to a one symbol period resolution.

Also, Japanese Patent Application Publication (JP-A-Heisei 11-341102) requires that m' frame bits are added to the actual data to be transmitted. Therefore, to carry effectively m bits of data within the network, H11-341102 requires in fact m+m' bits to be physically transmitted through the network. Therefore, the bandwidth of the transmitters and receivers in the network when JP-A-Heisei 11-341102 is implemented has to be higher than the bandwidth necessary to carry the data. This increases the cost and complexity of receivers and may cause a degradation of the performance of the receiver. Moreover, in JP-A-Heisei 11-341102, the receiver must distinguish m' bits of the frame from the data. Therefore, the frame must be especially composed so it cannot be mistaken for data and data must be encoded so that it cannot be mistaken for the frame. Other proposed methods of generating the frame requires information from layers higher than the physical layer of the network in order to monitor and compensate skew to the channel. Such requirement increases the complexity of the receiver. Skew monitoring is dependant on higher layer information and in return, higher layer information necessitates skew compensation to be retrieved, and skew compensation depends on the monitored skew. This may have a negative impact on the stability of the integrity of the received data when distortions appear on the transmission path. Finally, in JP-A-Heisei 11-341102, the skew is measured in shifts of bits or symbols of the frame transmitted through the network. This is a coarse estimation which is limited to a one symbol period resolution.

SUMMARY OF INVENTION

The object of the present invention is to provide a simple method to monitor the transmission skew between parallel signals generated from a serial signal, usable on wide skew ranges and without necessitating the information of upper layers, or the presence of a training pattern or prefix added to the transmitted data.

In an aspect of the present invention, a method is provided with: monitoring the skew between parallel signals. The monitoring step includes: imprinting dips on the optical amplitude of the light signal between a determined number of symbols for each parallel signal; detecting electrical signals corresponding to the optical amplitude dips of the parallel channels to monitor; generating a signal proportional to the transmission skew from said electrical signals. Said dips are carved between symbols of the light signal and preferably do not affect the central part of the symbol, therefore do not affect the quality of the transmitted information. In another aspect of the invention, the period of the optical amplitude dip is different for each parallel signal and the frequency of the detected electrical signals are converted in order to be compared and to generate the information proportional to the intra-channel skew.

In another aspect of the invention, the period of the optical amplitude dip is different for each parallel signal and the frequencies of the detected electrical signal are converted to be compared. Moreover, the difference of the frequency of the dips is used to distinguish the parallel signals at the receiver.

In another aspect of the invention, the electrical signals containing the information of the dips are recovered for each parallel signal after the demultiplexing of the parallel signal.

In another aspect of the invention, the period of the optical amplitude dip imprinted on the parallel signals is changed during the monitoring of the transmission skew, in order to improve the precision of the monitoring. The generated signal proportional to the skew is generated for different cases of period of the optical amplitude dip.

In another aspect of the invention, the electrical signals recovered for the parallel signals are used to generate a clock signal. Said clock signals can be used to control the demultiplexing of the parallel signals or the processing of the received signals.

In still another aspect of the invention, an optical transponder is provided with an optical transmitter emitting polarization-multiplexed signals carrying information to transmit and an optical receiver recovering the data carried by polarization-multiplexed signals. The transmitter is provided with an apparatus capable of imprinting dips on the optical amplitude between a fixed number of symbols for each polarization multiplexed signal. The receiver is provided with: a polarization demultiplexing scheme; apparatus capable of detecting an electrical signal related to the optical amplitude dip for each polarization-multiplexed signal; apparatus generating a signal proportional to the transmission skew between the polarization multiplexed signals from said electrical signal.

In still another aspect of the invention, an optical transponder is provided with: optical transmitters emitting parallel signals at different wavelengths generated from a higher bit rate serial signal; optical receivers recovering the data carried by the parallel signals. The transmitters are provided with apparatus capable of imprinting dips on the optical amplitude between a fixed number of symbols for each parallel signal. The receivers are provided with: apparatus capable of generating electrical signals related to the optical amplitude dip for each parallel signal; apparatus capable of generating a signal proportional to the transmission skew between the wavelength multiplexed signals from said electrical signals.

In still another aspect of the invention, an optical transponder is provided with: optical transmitters emitting parallel signals generated from a higher bit rate serial signal, where the parallel signals are space division multiplexed; optical receivers recovering the data carried by the parallel signals. The transmitters are provided with apparatus capable of imprinting dips on the optical amplitude between a fixed number of symbols for each parallel signal. The receivers are provided with: apparatus capable of generating electrical signals related to the optical amplitude dip for each parallel signal; apparatus generating a signal proportional to the transmission skew between the space division multiplexed signals from said electrical signals. In still another aspect of the invention, a measurement system is provided with an apparatus capable of imprinting an amplitude variation between a fixed number of symbols for each parallel signal, and another apparatus capable of detecting an electrical clock signal related to said optical amplitude variation for each polarization-multiplexed signal, detecting the phase difference between said clock signals for the polarization-multiplexed signals. The system is capable of returning a value proportional to the phase difference between the clock signals.

In the present invention, dips are inserted between a fixed number of symbols, but the time period of the symbols or the number of symbols to be transmitted within the network does not change. Therefore, when implementing the present invention, the transmitters and receivers can have the same bandwidth as the one necessary to carry the actual data, which is an improvement when compared to background art relying on overheard or training patterns. In addition, in the present invention, no constraint is added to the encoding of the data, which makes encoding more simple when compared to the use of overheads or training patterns. In the present invention, the skew monitoring does not required data to be decoded as with overheads or training patterns, therefore it is not directly sensible to errors within transmitted bits. The present invention compares electrical signals generated from the detected dips, therefore the measurable skew is finer than one bit or symbol period transmitted through the network. In the present invention, no constraint is added to the relation between the physical receiver and higher layer information. Skew monitoring is independent from higher layer information, which enable simpler receiver structures as compared to background art using FEC or upper layer information.

BRIEF DESCRIPTION OF DRAWINGS

The above and other advantages and features of the present invention will be more apparent from the following descriptions taken in conjunction with the accompanied drawing, in which:

FIG. 2 is a diagram showing time charts of the apparatus of FIG. 1;

FIGS. 3A to 3D are diagrams showing simulation results for a light signal with dips imprinted on the optical amplitude;

FIGS. 5A to 5E are diagrams showing time charts and a graph of the apparatus of FIG. 4;

DESCRIPTION OF EMBODIMENTS

Figure 1:
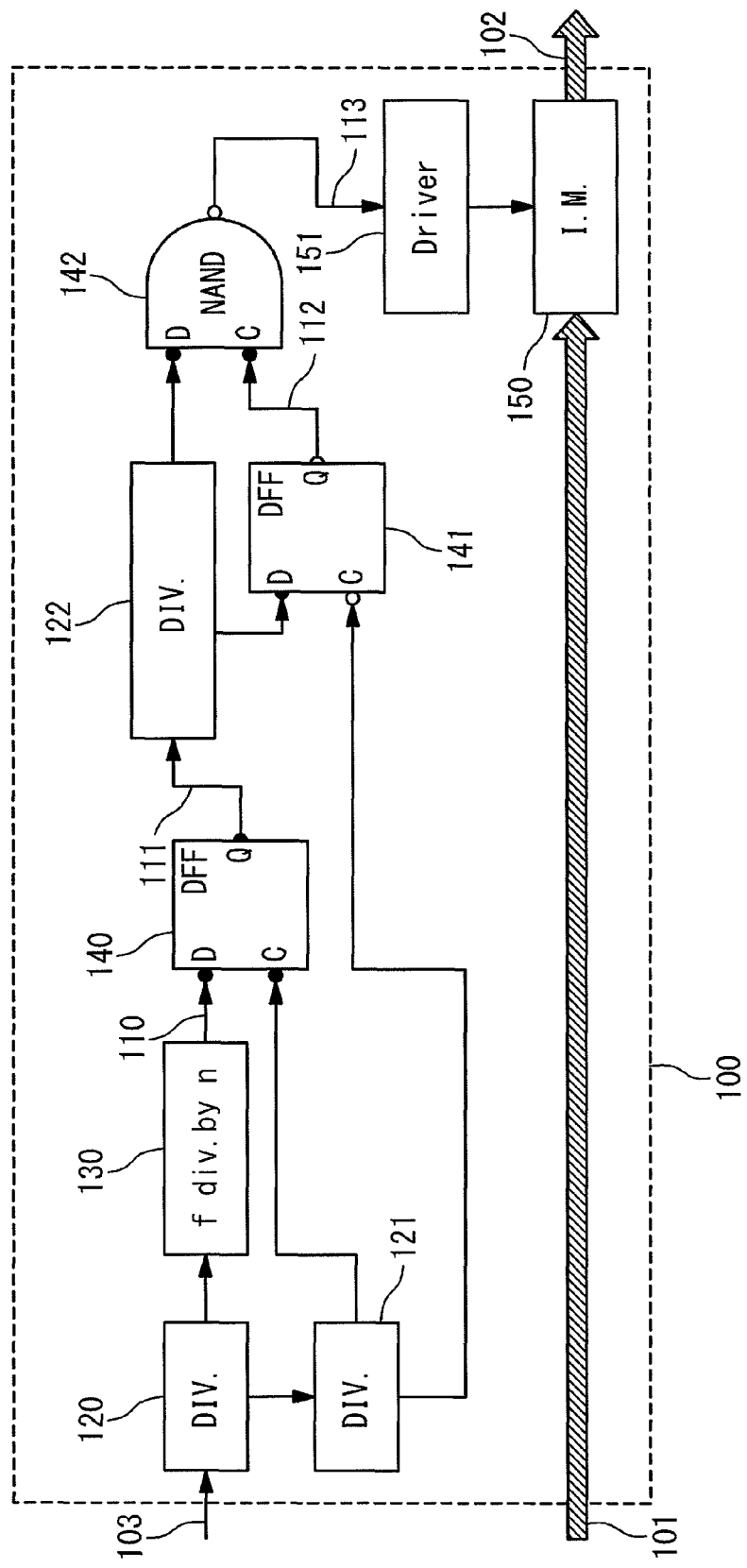
FIG. 1 is a block diagram schematically showing a configuration of an apparatus generating optical amplitude dips.

FIG. 1 is a block diagram schematically showing a configuration of an apparatus, which can be used in order to imprint a dip on the optical amplitude of a light signal. Before explaining in detail the apparatus of FIG. 1, the Pseudo-Return-to-Zero format of index n (P-RZ(n)) is defined in analogy to Return-to-Zero (RZ) and Non-Return-to-Zero (NRZ) formats. In RZ format, the optical amplitude returns to zero between two consecutive symbols. In NRZ format, the optical amplitude does not return to zero between consecutive symbols, and it is forced to zero if and only if the symbol amplitude is zero or crosses zero. In P-RZ(n) format, the amplitude returns to zero between consecutive symbols every n symbols and does not return to zero in the other cases, unless the symbol amplitude is zero or crosses zero. P-RZ(n) format is not a RZ format of at an n time slower clock frequency, as the amplitude is forced to zero and is relaxed at a very steep slope (same slope as RZ). P-RZ(n) causes dips on the optical amplitude every n symbols, as required by the present invention and is therefore suitable for the present invention. On the contrary, RZ format at an n time slower clock frequency would cause a n time slower slope when the amplitude is forced to zero and would cause degradation of the quality of the transmission as the central part of symbols are affected by the slow slope of the amplitude change. Therefore, RZ at an n time slower clock speed is not suitable for the present invention, whereas P-RZ(n) is a valid option. As an extension of our notation, P-RZ(1) is RZ format and P-RZ($\infty$) is NRZ format.

A system 100 is a P-RZ(n) carver, which transforms a NRZ light signal 101 into a P-RZ(n) light signal 102. A clock signal 103 is a signal at the symbol rate (of frequency f) of the input NRZ light signal 101. The clock signal 103 is divided by a divider 120 into two identical clock signals. One of these signals is divided again by a divider 121, to be fed into D-type Flip Flops (DFF) 140 and 141. The other output signal of the divider 120 is transformed by a frequency divider 130 into a clock signal 110 of frequency f/n. The DFF 140 detects the signal 110 at a rising edge according to the clock signal of frequency f supplied from the divider 121. The output of flip-flop 140 is a signal 111, which is divided by a divider 122. One of the outputs of the divider 122 is fed into a logical NAND gate 142, and the other output of the divider 122 is fed into the DFF 141. The DFF 141 detects the output of the divider 122 (equal to the signal 111) according to the clock signal of frequency f supplied from the divider 121. The clock input of the D-type flip-flop 141 is negated, so that the D-type flip-flop 141 operates on the falling edge of the output of the divider 121. The negated output of the D-type flip-flop 141 is a signal 112, which is fed into the logical NAND gate 142. The output signal of the gate 142 is a signal 113, which is fed into a driver 151, which converts it into a voltage to command an intensity modulator 150, so that the transmission of the intensity modulator 150 becomes maximum when the signal 113 is high and the transmission of the intensity modulator 150 becomes minimum (ideally null) when the signal 113 is low.

FIG. 2 is a diagram showing timing charts of logical signals used in the P-RZ(n) carver shown in FIG. 1, when n=4. In FIG. 2, 200 denotes the clock signal 103 of the frequency f, and 201 denotes the clock signal 110 of the frequency f/4. 202 denotes the output 111 of the D-type flip flop 140, 203 denotes the output 112 of the D-type flip flop 141, and 204 denotes the output 113 of the NAND gate 142. In this case, dips of f/2 width are imprinted on the light signal 101 every other 4 symbol. In that case, the output 102 is P-RZ(4) signal. According to FIG. 2, the apparatus of FIG. 1 enables to generate P-RZ(n) format, which is suitable for the present invention.

FIGS. 3A to 3D represent graphs of simulated results for different QPSK transmitters. All the transmitters have the bit rate of 56 GHz, i.e. the baud rate of 28 Gbaud (f=28 GHz according to the notation of the explanation of FIG. 1). A graph 300 represents an optical amplitude for a NRZ QPSK (P-RZ($\infty$)-QPSK) transmitter and the corresponding constellation map 310 is plotted. The optical amplitude is a maximum (1.4 AU) during at the center of symbols and between symbols when consecutive symbols have the same phase. The optical amplitude drops to 1 AU between symbols when consecutive symbols have a phase difference of ($\pm\pi/2$) radians. The optical amplitude is minimum (0 AU) between symbols when consecutive symbols have a phase difference of $\pi$ radians. A graph 301 represents the optical amplitude for a RZ-QPSK (P-RZ(1)-QPSK) transmitter and the corresponding constellation map 311 is plotted. The amplitude drops to 0 AU between consecutive symbols, whatever the phase difference between symbols may be. A graph 304 represents the optical amplitude for a P-RZ(4)-QPSK transmitter and the corresponding constellation map 314 is plotted. The optical amplitude is similar to one NRZ-QPSK, but with a dip imprinted every 4 symbols. The dip imprinted by P-RZ(4) is identical to the dip of RZ between symbols. A graph 308 represents the optical amplitude for a P-RZ(8) QPSK transmitter and the corresponding constellation map 318 is plotted. The optical amplitude is similar to one NRZ QPSK, but with a dip imprinted every 8 symbols. The dip imprinted by P-RZ(8) is identical to the dip of RZ between symbols. A spectrum 320 of the electrical signal generated through the conversion of the light signal of the NRZ-QPSK transmitter by a photo-diode. One peak is standing at the symbol frequency (f=28 GHz). A spectrum 321 of the electrical signal generated through the conversion of the light signal of the RZ QPSK transmitter by a photo-diode. One peak is standing at the frequency f. A spectrum 324 of the electrical signal generated through the conversion of the light signal of the P-RZ(4) QPSK transmitter by a photo-diode. The main peak stands at the frequency f/4, followed by another peak at f. Lesser peaks are presents at other harmonics of the frequency f/4. A spectrum 328 of the electrical signal generated through the conversion of the light signal of the P-RZ(8) QPSK transmitter by a photo-diode. The main peak stands at the frequency f, followed by another peak at f/4. Lesser peaks are presents at other harmonics of the frequency f/8. FIG. 2 illustrates the fact that for P-RZ(n), a dip is carved every n symbols. When converting the light signal into electrical signal, the main frequency components appear at f and f/n.

Figure 4:
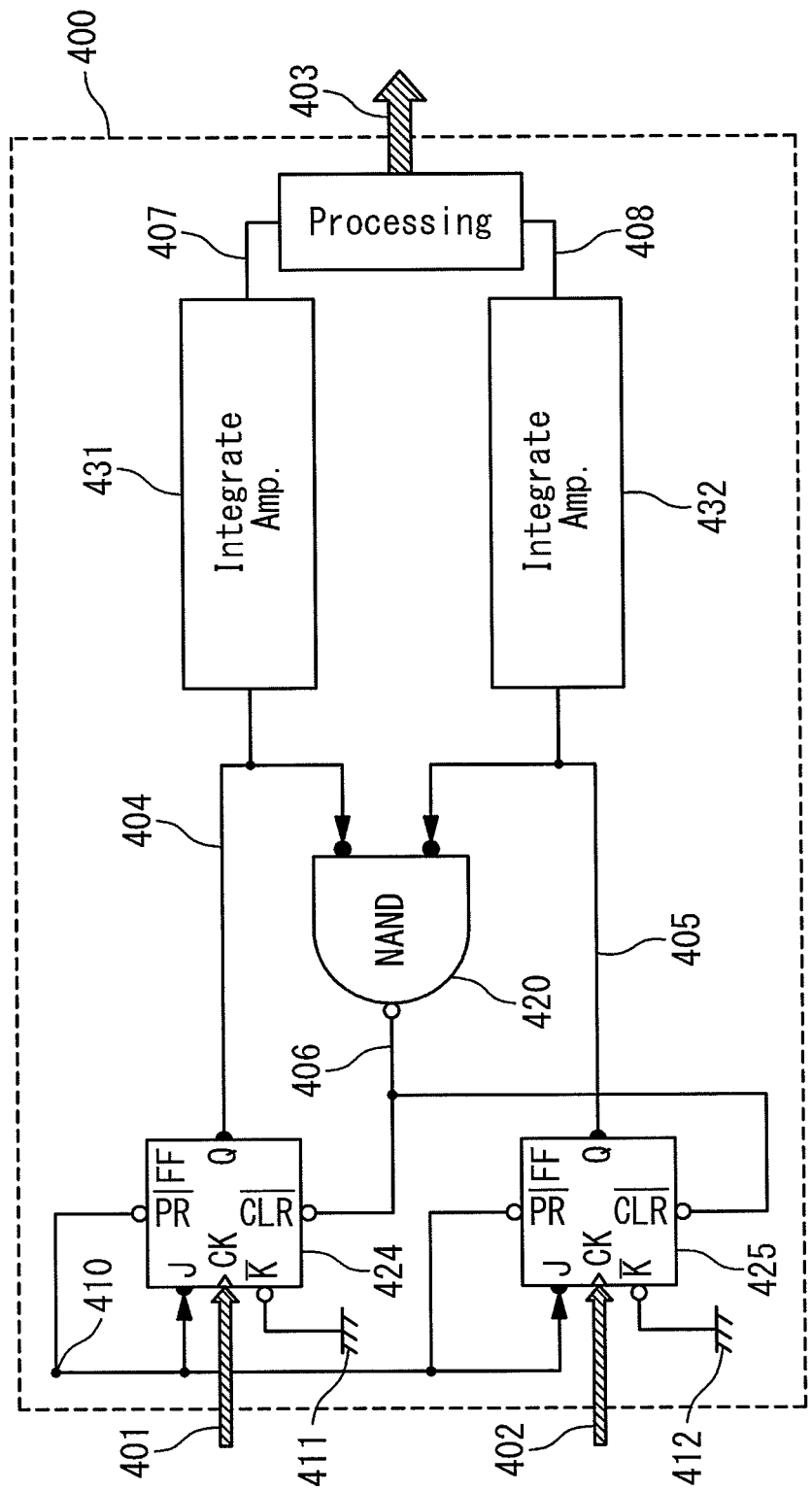
FIG. 4 is a block diagram schematically showing a configuration of an apparatus generating a signal proportional to a delay between clock signals.
Figure 5B:
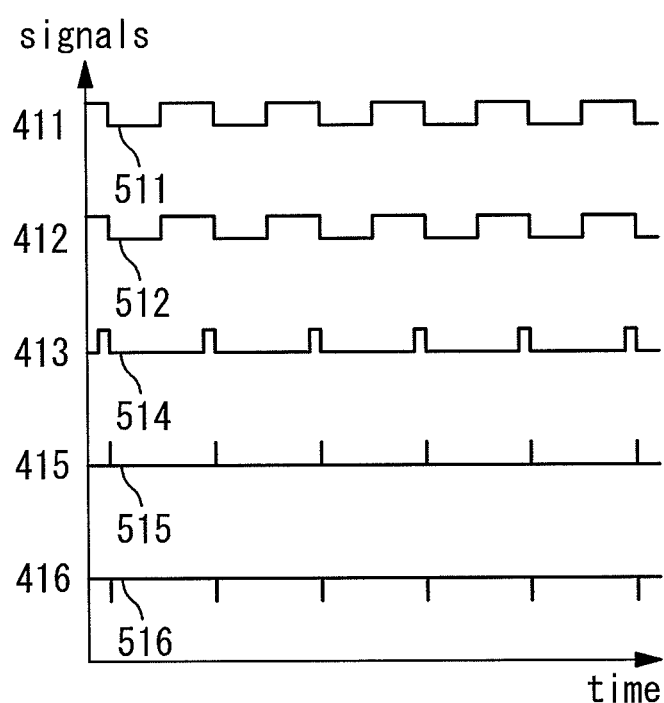
Figure 5C:
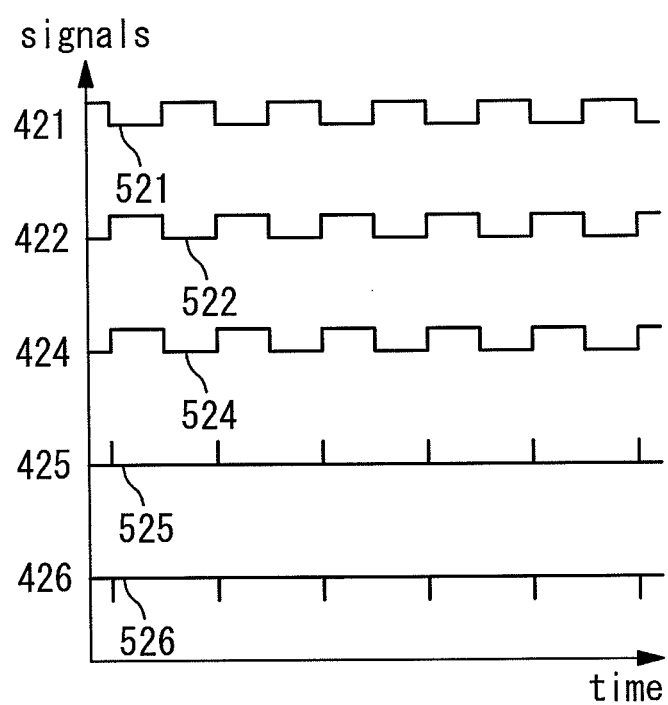
Figure 5D:
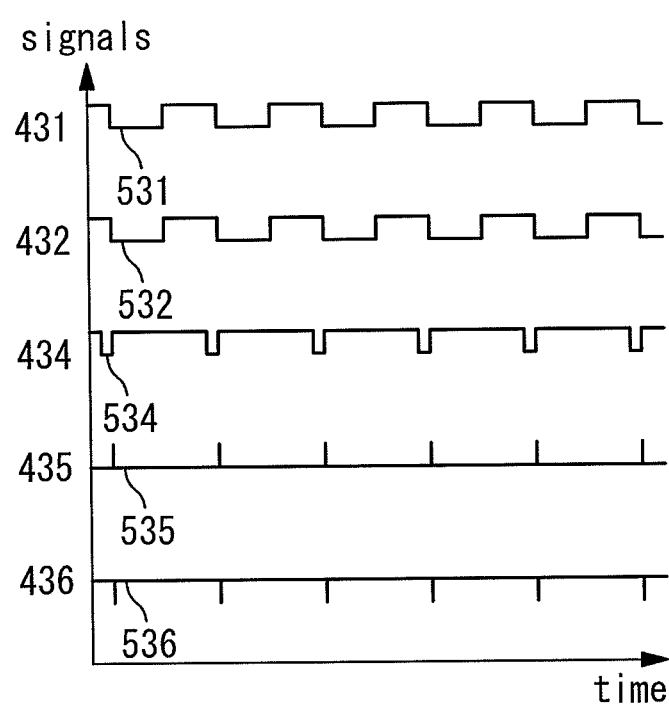
Figure 5E:
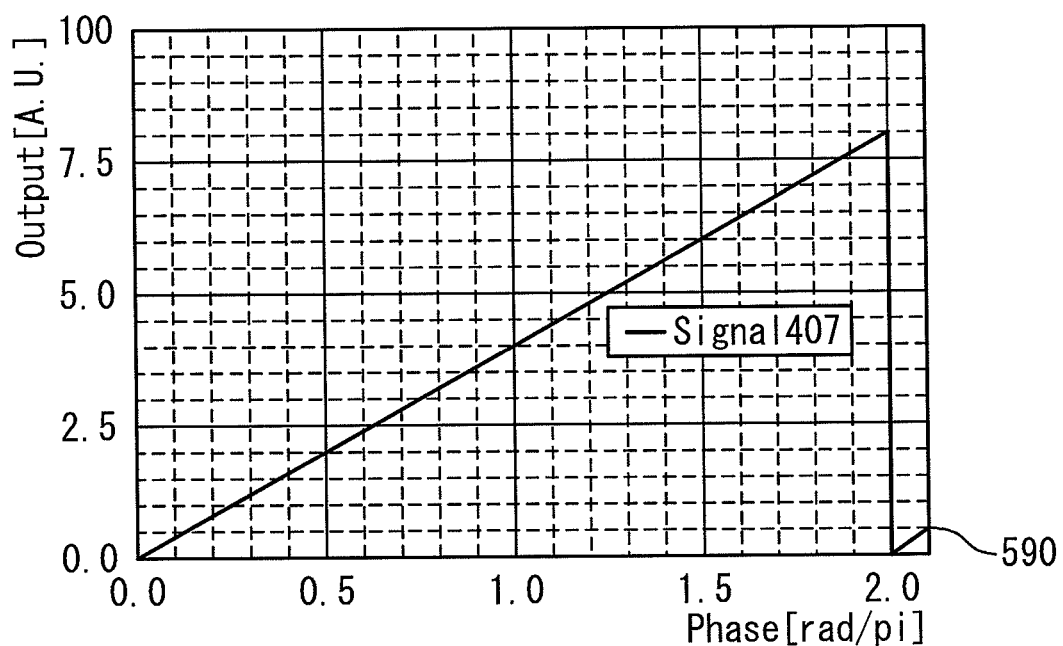

FIG. 4 is an apparatus which can be used to measure a phase difference between two signals at the same frequency. A phase comparator 400 compares a phase difference between input signals 401 and 402 and generates a voltage 403, which is proportional to the phase difference. Two toggled flip flops 424 and 425 have clear terminals. The input signals 401 and 402 are connected to the clock inputs of the flip flops 424 and 425, respectively. J inputs of the flip flops 424 and 425 and inverted PR bar inputs of the flip flops 424 and 425 are connected to a high level voltage 410. Inverted K bar inputs of the flip flops 424 and 425 are connected to the ground levels 411 and 412. Q outputs 404 and 405 of the flip flops 424 and 425 are connected to the inputs of a logical NAND gate 420. The output 406 of the NAND gate 420 is connected to the inverted CLR bar inputs of the flip flops 424 and 425. Integrating amplifiers 431 and 432 amplify and integrate the signals 404 and 405 over one period of the input signals 401 and 402, respectively FIGS. 5A to 5D represent time charts of signals 401, 402, 404, 405 and 406 for different phase difference cases, and FIG. 5E is a graph. In FIG. 5A, 501, 502, 504, 505 and 506 represent time charts of the signals 401, 402, 404, 405 and 406, respectively, when the phase difference between the clock signals 401 and 402 is 0, and when the first clock falling edge transition is detected on the clock signal 401. In FIG. 5B, 511, 512, 514, 515 and 516 represent time charts of the signals 401, 402, 404, 405 and 406 respectively, when the phase difference between the clock signals 401 and 402 is π/8, and when the first clock falling edge transition is detected on the clock signal 401. In FIG. 5C, 521, 522, 524, 525 and 526 represent time charts of the signals 401, 402, 404, 405 and 406 respectively when the phase difference between the clock signals 401 and 402 is π, and when the first clock falling edge transition is detected on the clock signal 401. In FIG. 5D, 531, 532, 534, 535 and 536 represent time charts of the signals 401, 402, 404, 405 and 406 respectively when the phase difference between 401 and 402 is 7π/8, and when the first clock falling edge transition is detected on the clock signal 401. As shown in FIG. 5E, a graph 590 plots an output signal 407 of the integrating amplifier 431 against the phase difference between the clock signals 401 and 402, when the first clock falling edge is detected on the signal 401. In that case, an output signal 408 of the integrating amplifier 432 is null. When the first clock falling edge is detected on the signal 402, the graph 590 can be seen as a plot of the signal 408 plotted against the phase difference between the signals 402 and 401, the signal 407 being null. This is due to the symmetry between elements 401, 424, 404, 420 on one side and elements 402, 425, 405, 420 on the other side. A processing circuit 430 detects the signals. 407 and 408. If the signal 408 is lower than the signal 407, this means that the first clock falling edge was detected on the signal 401 and the processing circuit 430 generates a signal 403 which is equal to the signal 407. If the signal 407 is lower than the signal 408, this means that the first clock falling edge was detected on the signal 402 and the processing circuit 430 generates the signal 403 which is a difference between a maximum value achievable by the signal 408 and a current value of the signal 408. Therefore, the signal 403 is proportional to the phase difference between the signals 401 and 402 in all cases. The apparatus 400 can generate the voltage 403 proportional to a delay between the signals 401 and 402.

Figure 6:
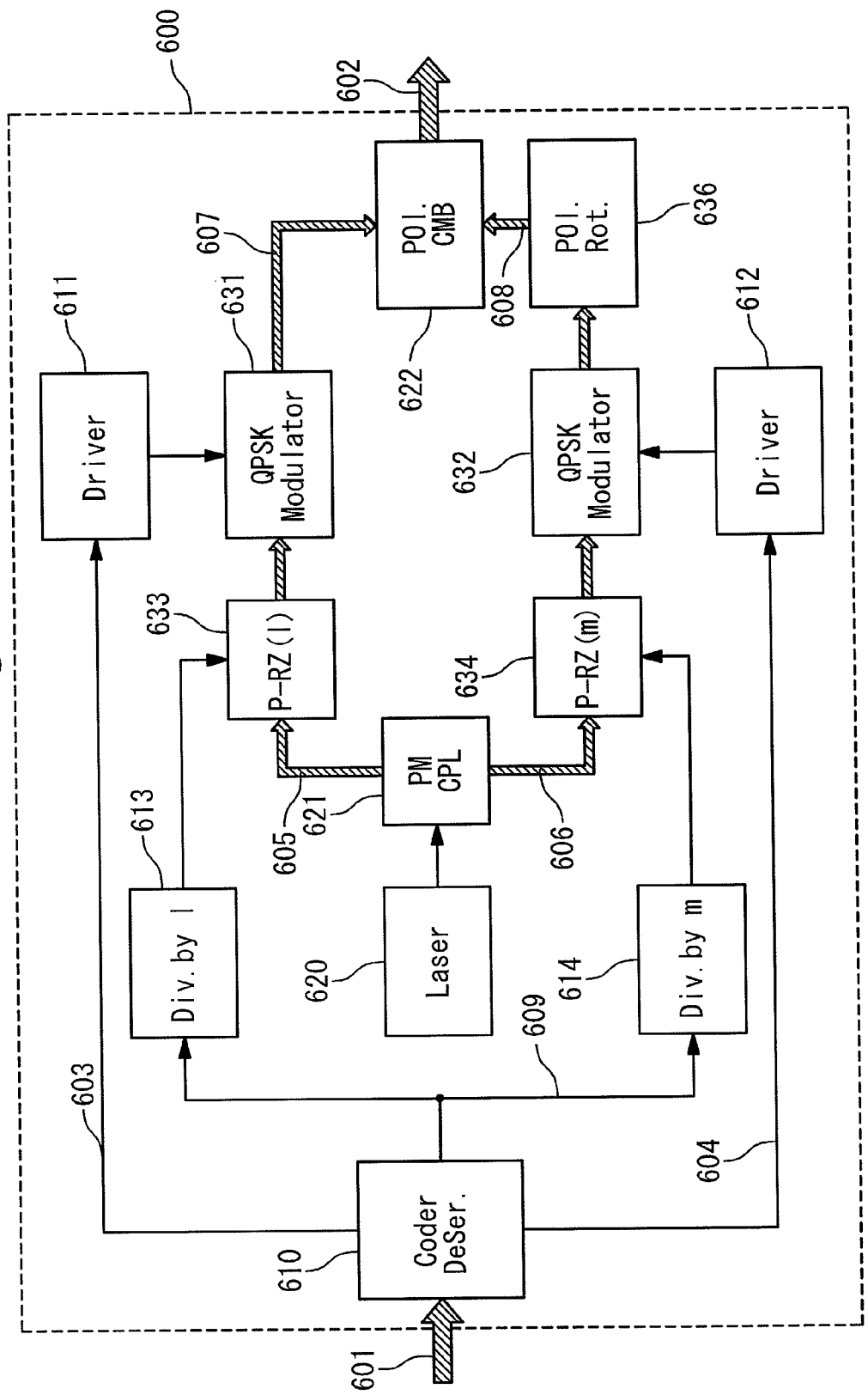
FIG. 6 is a block diagram schematically showing a configuration of an optical transmitter emitting polarization multiplexed signals with dips imprinted on the light signals.

FIG. 6 is a block diagram schematically showing an optical Polarization Multiplexed (PM) QPSK transmitter emitting polarization multiplexed signals with dips of different frequencies imprinted on each polarization signal. An optical Polarization Multiplexed P-RZ(l,m) QPSK transmitter 600 emits two PM light signals, one being P-RZ(l)-QPSK and the other P-RZ(m)-QPSK. A serial electrical data 601 is coded and de-serialized into two parallel electrical signals 603 and 604. The parallel signals 603 and 604 are converted into appropriate voltages by drivers 611 and 612 to imprint a data on the phases of optical carrier signals 605 and 606 by QPSK modulators 631 and 632. A clock signal 609 of a frequency f equal to a baud rate of an emitted optical carrier signal 602 is split and divided by l and by m by frequency dividers 613 and 614. The clock signals at frequency f/l and f/m are fed into P-RZ(l) and P-RZ(m) carvers 633 and 634, which are identical to the carver 100 of FIG. 1. A laser 620 emits an optical carrier signal linearly polarized, which is divided by a polarization maintaining coupler 621 with the ratio of 50:50 into the two optical carrier signals 605 and 606. The P-RZ(l) carver 633 imprints dips at the frequency f/l on the optical carrier signal 605. The P-RZ(m) carver 634 imprints dips at the frequency f/m on the optical carrier signal 606. The phases of the optical carrier signals 605 and 606 are modulated by QPSK modulators 631 and 632. A polarization rotator 636 rotates the polarization of the carrier signal 606 by π/2 radians, so that the polarizations of modulated light signals 607 and 608 are orthogonal to each other. The orthogonal polarizations 607 and 608 are multiplexed by a polarization combiner 622. The light signal 602 is a result of the polarization multiplexing of two parallel signals carrying the de-serialized information of the serial signal 601. One polarization has dips on the optical amplitude at the frequency f/l. The other polarization has dips on the optical amplitude at the frequency f/m.

Figure 7:
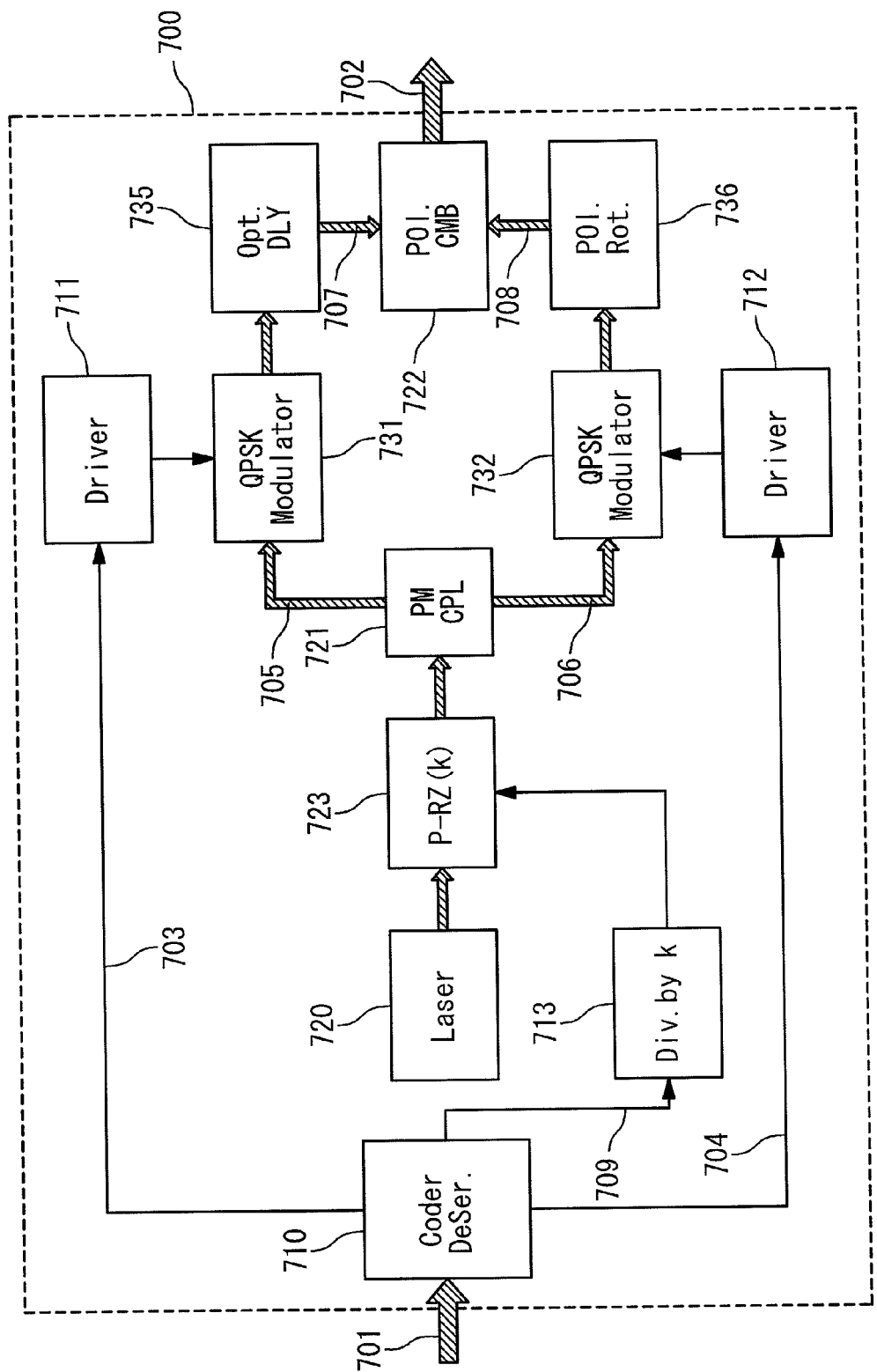
FIG. 7 is another block diagram schematically showing a configuration of the optical transmitter emitting polarization multiplexed signals with dips imprinted on the light signals.

FIG. 7 is a block diagram schematically showing an optical Polarization Multiplexed QPSK transmitter emitting polarization multiplexed signals with dips imprinted on each polarization signal. A serial electrical data 701 is fed into an optical Polarization Multiplexed P-RZ(k) QPSK transmitter 700. A light signal 702 is emitted by the transmitter 700. Signals 703, 704, 705, 706, 707, 708 and 709 are similar to the signals 603, 604, 605, 606, 607, 608 and 609 in FIG. 6. Devices 710, 711, 712, 720, 721, 722, 731, 732 and 736 are identical to the devices 610, 611, 612, 620, 621, 622, 631, 632 and 636 in FIG. 6. A variable optical delay line 735 has been placed on the optical path between the modulator 731 and the polarization combiner 722 in order to shift the polarization before the emission. The clock signal 709 of the frequency f equal to the baud rate of the emitted lightwave signal 702, passes through a frequency divider 713 and the resultant clock signal of the frequency f/k is fed into a P-RZ(k) 723, which is similar to the carver 100 on FIG. 1. The carver 723 imprints dips on the optical amplitude of the signal emitted by the laser 720 and the resultant carved signal is split by a polarization maintaining coupler 721. The light signal 702 is the result of the polarization multiplexing of two parallel signals carrying the de-serialized information of the serial signal 701. Both the polarizations have dips on the optical amplitude of the frequency f/k. The variable delay line 735 enables to shift the timing of the emitted multiplexed signals. For example, in one configuration, the dips for each polarization coincide (bit superposed). In another configuration, the dips of one polarization coincide with the middle of an interval between dips of the other polarization, which is the delay of k/2 symbols (bit interleaved).

Figure 8:
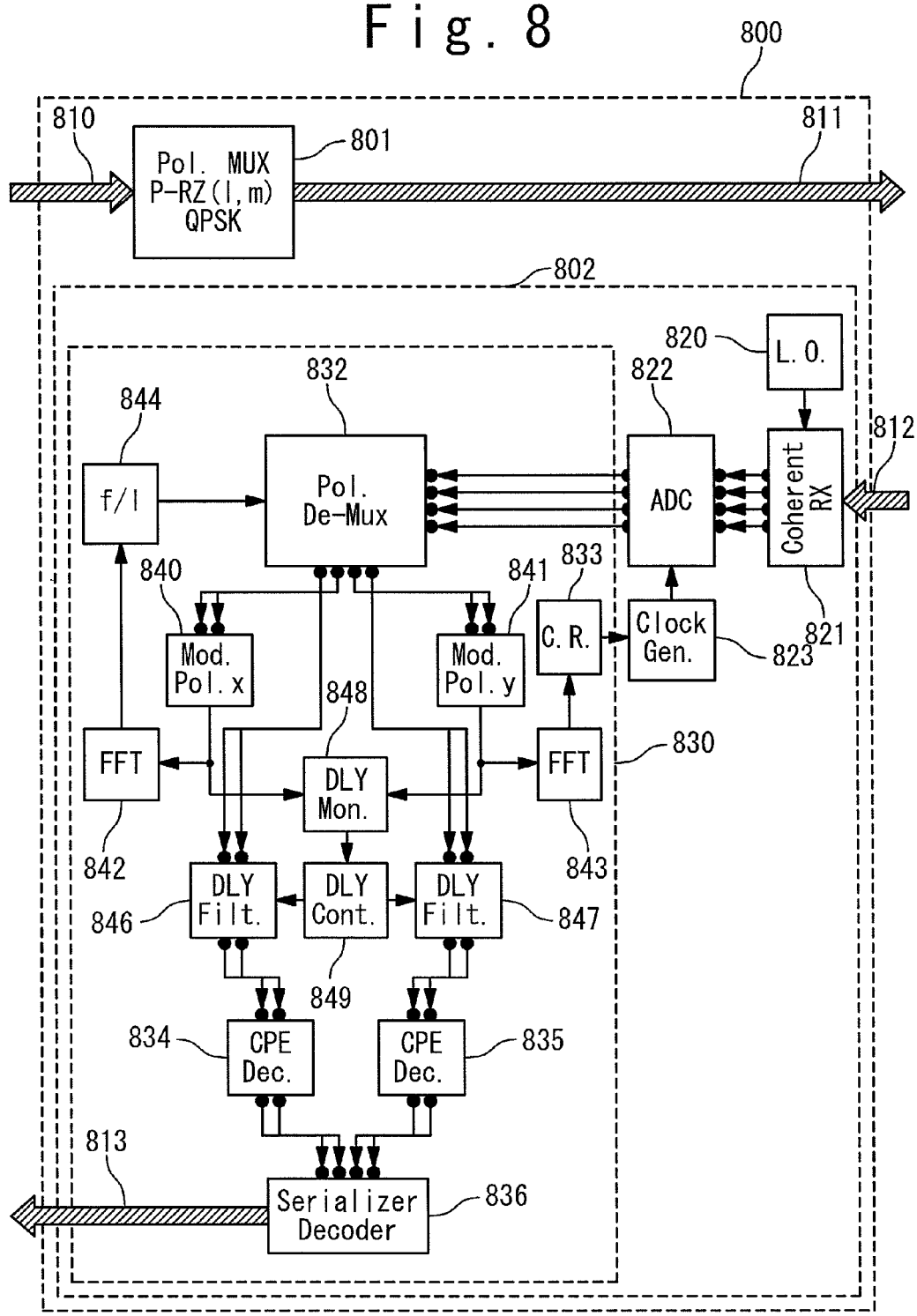
FIG. 8 is a block diagram schematically showing a configuration of a transponder emitting and receiving polarization multiplexed signals in case of application to digital demultiplexing of the received signals.

In one exemplary embodiment, the present invention is incorporated in a transponder shown in FIG. 8. A polarization multiplexed QPSK transponder 800 incorporates the present invention. The transponder 800 has an optical transmitter 801, which is similar to the transmitter 600 in FIG. 6, and an optical receiver 802. A 100 Gbit/s data stream 810 is de-serialized and transmitted by the transmitter 801 on two polarizations of a light carrier signal 811, at the symbol rate of 25 Gbaud, therefore, at the symbol period of 40 ps. We select l=8 and m=4 in order to enable a path skew monitoring of ±40×(m/2)=80 ps.

Another polarization multiplexed QPSK signal 812 at 25 Gbaud emitted by an optical transmitter similar to the transmitter 801. The receiver 802 receives the signal 812, monitors a transmission skew of the signal 812 and compensates it, decodes and re-serializes the tributary signals into the 100 Gbit/s data stream 813. The operation principle of the transmitter 801 has already been described with reference to FIG. 6.

Now, an example of operation of 802 will be described. A coherent receiver 821 consists of two 90° hybrids mounted in a polarization diversity scheme, their output being connected to four differential photodiodes (not shown, which are included in the receiver 821), each of them being connected to an amplifier (which is also included in the receiver 821). The receiver 821 receives the signal 812, mixes it with the light signal from a laser 820 used as a local oscillator, and converts lightwave signal into four electrical signals. The output signals of the receiver 821 are converted into four digital signals by the Analog to Digital Converter (ADC) Unit 822 operating at 2 samples by symbol per signal. The resultant four digital signals are transmitted to a processing unit 830.

The polarizations, Polarization X and Polarization Y, are then demultiplexed in a demultiplexing unit 832, where the processing is based on Constant Modulus Algorithm (C.M.A). A complex signal of one of the polarizations, the Polarization X, is then processed by a unit 840 to calculate its squared modulus, which reflects the properties of the optical amplitude of the received signal. The spectrum of the square modulus is calculated by Fast Fourier Transform (FFT) by an FFT unit 842 and the result is analyzed by an analyzing unit 844, which looks for a component of f/l (3.125 GHz) in order to check if the Polarization X is a signal having the P-RZ(8) component and not the signal having the P-RZ(4) component. If the signals demultiplexed at the demultiplexing unit 832 are inverted, the unit 844 does not find the f/l component and the unit 844 instructs the unit 832 to invert the outputs of both of retrieved polarization signals, Polarization X and Polarization Y. The use of the component of P-RZ(8) to identify the signals enables to reduce the identification cases of a prefix or training pattern incorporated in the transmitted light signal. In a similar manner, the square modulus of Polarization Y is calculated by a unit 841, its spectrum is analyzed by a FFT unit 843 and the component of f/m=6.25 GHz can be used to retime the data in a clock generator 823. The output of a unit 833 is then used by a clock generator 823 to generate the clock signal for the timing of the ADC unit 822.

The component of P-RZ(4) is used for clock recovery in the processing unit 830, with modest processing resource. A delay monitor unit 848 analyzes the square modulus of each of Polarization X and Polarization Y and calculates a delay between dips of f/m=2×f/l=6.25 GHz. The delay monitor unit 848 calculates a link skew between the multiplexed polarizations from the P-RZ carvers of the transmitter, which emits the signal 813, to the coherent receiver 820. The unit 848 detects the skew between the polarizations X and Y by comparing the information from the units 840 and 841. A delay control processing unit 849 controls delay filtering units 846 and 847 according to the information from the delay monitor unit 848 to filter Polarization X and Polarization Y with buffers and interpolation filters in order to compensate the skew between Polarization X and Polarization Y. That is, the delay control processing unit 849 computes the coefficients and buffer size of the units 846 and 847, according to the skew detected by the unit 848 in order to compensate for the skew between the polarizations X and Y. Units 834 and 835 are identical and may be integrated. CPE stands for Carrier Phase Estimation. It is described in detail in "PLL-Free Synchronous QPSK Polarization Multiplex/Diversity Receiver Concept With Digital I&Q Baseband Processing" (IEEE Photonics Technology Letters, VOL. 17, NO. 4, April 2005 pp 887-889) by R. Noe. In short, it is a calculation method, which enables to recover phase information after coherent reception without using a PLL. Dec stands for Decoding. Therefore the role of the units 834 and 835 is to recover the phase information and to decode this phase information (generate binary data for the recovered received information) for the polarizations X and Y. The units 834 and 835 compensate for a deviation of the frequency of the optical signal from the laser 820 based on the frequency of the optical carrier signal of the signal 812 by a carrier phase estimation method, and decide the symbols detected for Polarization X and Polarization Y. A unit 836 serializes and decodes the signals of the multiplexed polarizations X and Y. The signal 813 is the 100 Gbit/s signal received by the receiver 802.

The link skew between polarizations X and Y has been compensated by the receiver using the monitoring information of the present invention, so that the data signal 812 has been correctly received and converted into the data signal 813. In addition, the present invention can perform the clock recovery of the received signal and the distinction between the polarization X and the polarization Y, with moderate processing requirement and power consumption. The monitoring of skew does not necessitate the information of upper layers. The monitoring of skew does not necessitate the implementation of a training sequence.

In another exemplary embodiment, the frequency dividers 613 and 614 can be configured to change the integers l and m, by which the clock signal of the P-RZ carver is divided. During the transmission, in a first phase, l and m can be set to be large integers, so that the monitoring range is very wide; in a second phase, l and m can be reduced to monitor on narrower ranges. In that case, the processing units 844 and 848 are able to adapt their operation to the change of l and m.

Figure 9:
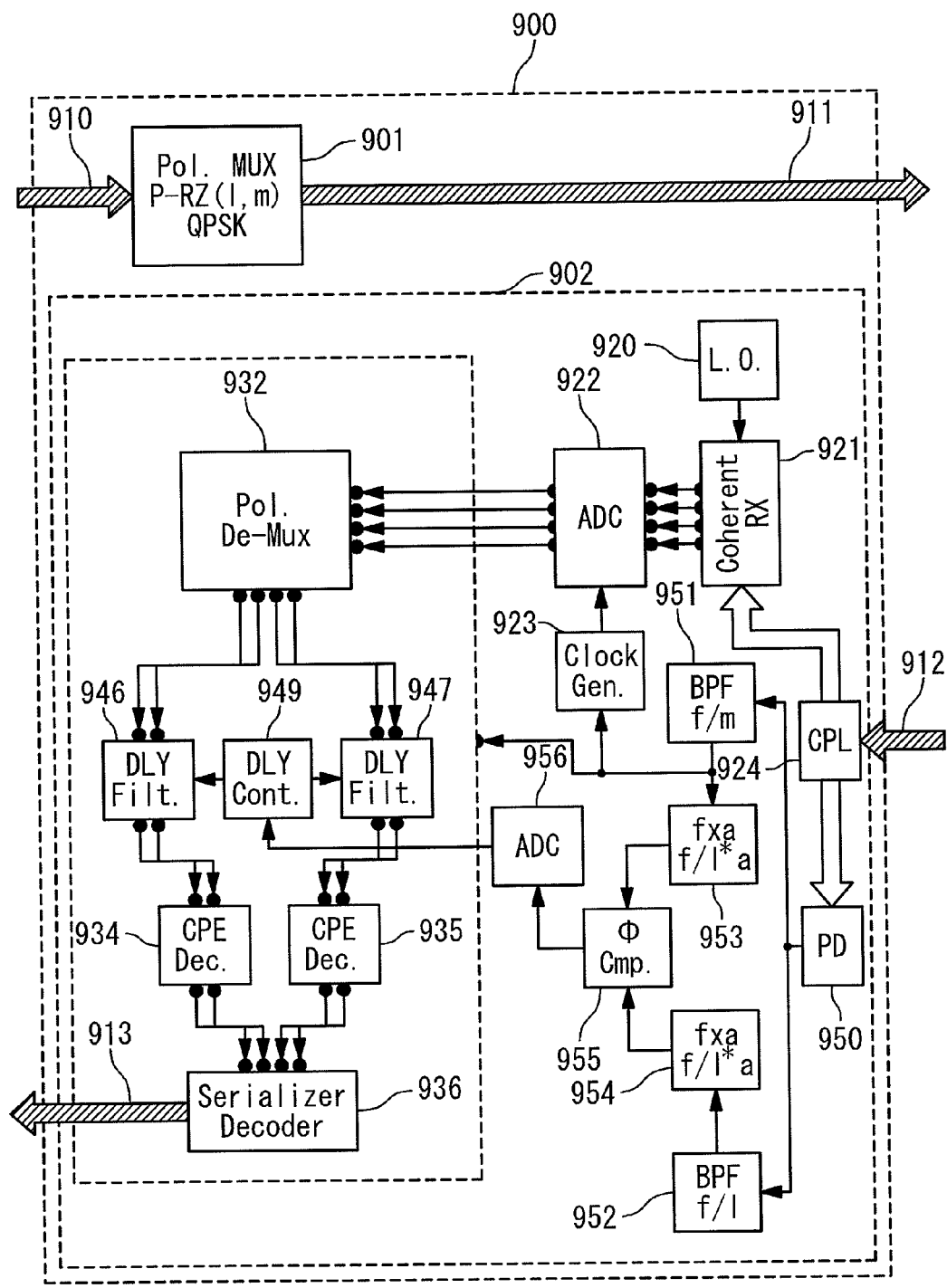
FIG. 9 is a schematic representation of a transponder emitting and receiving polarization multiplexed signals, implementing the invention applied to digital demultiplexing of the received signals.

In another exemplary embodiment, the present invention is incorporated in the transponder described on FIG. 9. A polarization multiplexed QPSK transponder 900 incorporates the present invention. The transponder 900 has an optical transmitter 901, which is identical to the transmitter 800 in FIG. 8, and an optical receiver 902. The signals 910, 911, 912 and 913 are identical to the signals 810, 811, 812 and 813 in FIG. 8. The devices 920, 921, 922, 923 are identical to the devices 920, 921, 922 and 923 in FIG. 8. The processing units 932, 935, 936, 946, 947 and 949 are identical to the processing units 832, 835, 836, 846, 847 and 849 in FIG. 8.

In this embodiment, the correction of the link skew between the polarizations is performed analogically outside a processing unit 930. First, the received light signal 912 is divided by a coupler 924. One output of the coupler 924 is connected to the coherent receiver 921. The other output is connected to a photodiode 950, which transforms the optical amplitude of the signal 912 into an electrical signal. This signal is split in two and the split signals are filtered by a band pass filter 951 centered around f/m (6.25 GHz in the previous numerical examples) and a band pass filter 952 centered around f/l (3.125 GHz in the numerical example). The filtered signals are then two clock signals of the respective frequencies of 6.25 GHz and 3.125 GHz, which contain the P-RZ information of the respective Polarizations X and Y. The clock signals are respectively multiplied by a ratio of the least common multiple of both P-RZ indices and the opposite P-RZ index. In this case, the frequency multiplier 954 multiplies the clock signal after the filter 952 by 2 (=8/4) and the frequency multiplier 953 would multiply the clock signal after the filter 951 by 1. Thus, in this example, the filter 951 can be replaced by an electrical delay line. A phase comparator 955 is identical to the apparatus 400 in FIG. 4. The electrical paths for the clock signals are designed so that the output signal of the comparator 955 is proportional to the link skew between the polarizations X and Y of the signal 912. The output signal of the comparator 955 is converted to a digital signal by an ADC circuit 956. The information of the ADC circuit 956 is used to control the Delay Control units 946 and 947 inside the processing unit 930. In addition, the clock signal of the frequency f/m after the filter 951, can be used to control a clock generator 923 used to control the timing of an ADC unit 922. It can also be used inside the processing unit 930. The distinction of the X polarization and Y polarization is made by pattern recognition in the processing unit 930.

The link skew between the polarizations X and Y has been compensated by the receiver using the monitoring information of the present invention, so that the data signal 912 has been correctly received and converted into a data signal 913. The monitoring of the link skew does not necessitate the information of any upper layer. In addition, the present invention enabled the clock recovery of the received signal.

Figure 10:
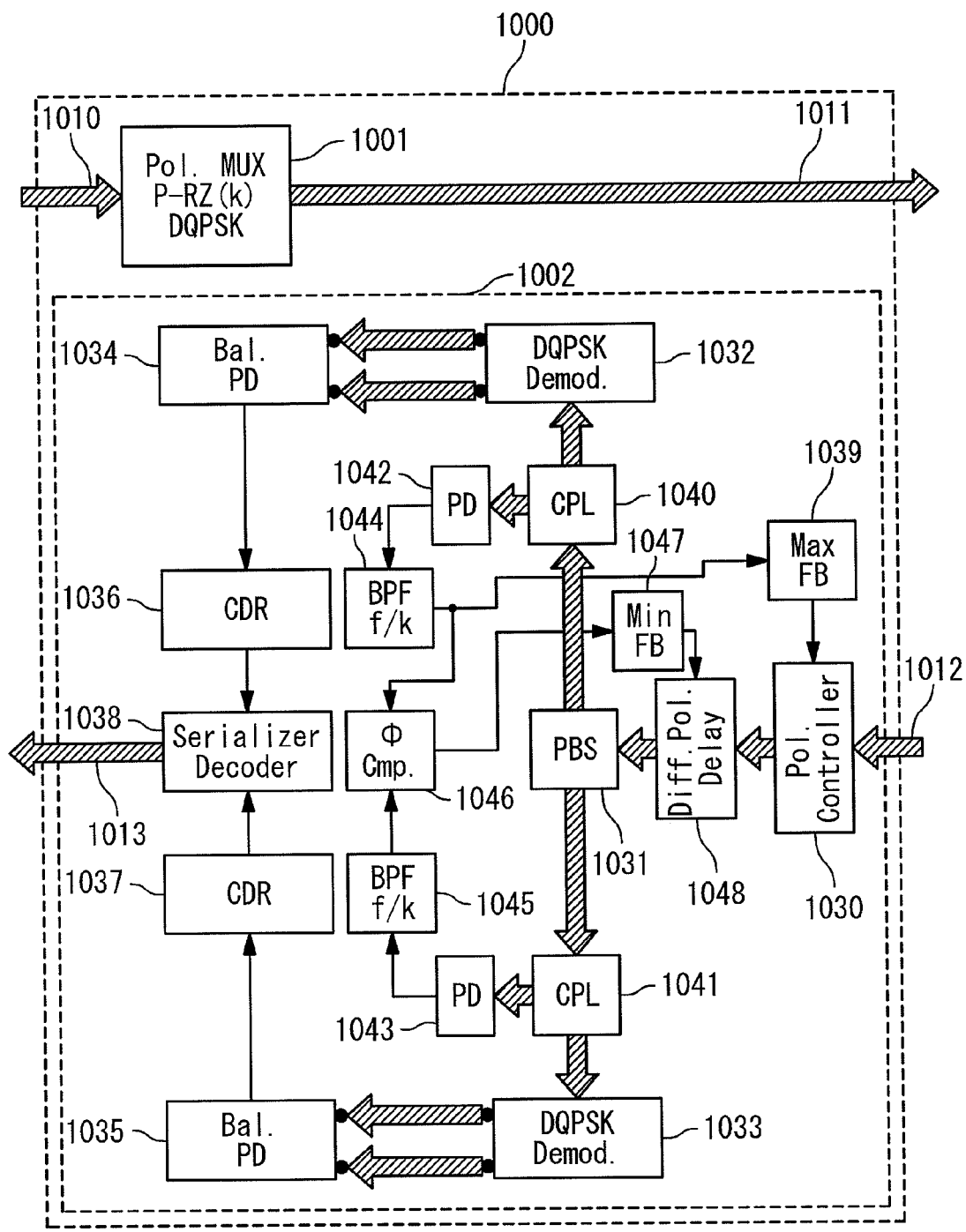
FIG. 10 is a schematic representation of a transponder emitting and receiving polarization multiplexed signals, implementing the invention applied to optical demultiplexing of the received signals.

In another exemplary embodiment, the present invention is incorporated in the transponder described on FIG. 10. A polarization multiplexed DQPSK transponder 1000 incorporates the present invention. The transponder 1000 has an optical transmitter 1001, which is identical to the transmitter 700 in FIG. 7, and an optical receiver 1002. The modulation format is DQPSK, therefore a coder 710 codes the data signal according to the DQPSK format. The variable optical delay line 735 is set so that the polarization X has the delay of k/2 symbols from the polarization Y at the output of the transmitter. This is similar to a bit interleaved configuration for a RZ polarization multiplexed transmitter, and enables optical polarization demultiplexing. A signal 1010 is a 100 Gbit/s data stream, which is de-serialized and transmitted by a multiplexing unit 1001 on two polarizations of the light carrier signal 1011, at the symbol rate of 25 Gbaud, therefore at the symbol period of 40 ps. We select k=4 in order to enable a path skew monitoring of ±40×(k/2)=80 ps.

A signal 1012 is another polarization multiplexed QPSK signal at 25 Gbaud emitted by an optical transmitter similar to the transmitter 1001. The receiver 1002 receives the signal 1012, monitors the transmission skew of the signal 1012 and compensates it, decodes and re-serializes the tributary signals into the 100 Gbit/s data stream 1013. A polarization controller 1030 rotates the polarization of the signal 1012 so that a polarization beam splitter 1031 separates the multiplexed polarizations and sends each of them to couplers 1040 and 1041. The polarizations are demultiplexed by one-symbol-delay interferometers 1032 and 1033 and the demodulated optical symbols are received by respective balanced photodiodes 1034 and 1035. The balanced photodiodes 1034 and 1035 convert the light signal into electrical signals, and the data are recovered by Clock and Data Recovery (CDR) units 1036 and 1037. The recovered data are then decoded and re-serialized by the parallel to a serial converter 1038. The converter 1038 is able to identify and permute, if necessary, the polarizations. The coupler 1040 splits one part of the separated polarizations and sends it to the photodiode 1042, which converts a signal proportional to the optical amplitude of the polarization into an electrical signal. The signal is filtered by a band pass filter 1044, which extracts the information at the frequency f/4 of the separated polarization. The extracted clock signal is split. One part can be used for the feedback to the polarization controller 1030 through a control circuit 1039, working as a maximum signal feedback. When the polarizations are perfectly demultiplexed, the clock signal is maximum as the dips carved by P-RZ(4) on both polarizations do not coincide, due to the delay of k/2 symbols between them at the output of the transmitter. The other part of the clock signal after the filter 1044 is send into the phase comparator 1046. The devices 1041, 1043 and 1045 are identical to the respective devices 1040, 1042 and 1044. The clock signal of the frequency f/4 extracted by a band pass filter 1045 is sent to the phase comparator 1046, which emits a signal proportional to the phase difference between the clock signals of the frequency f/4, therefore proportional to the skew between the polarizations. The phase comparator 1046 is identical to the apparatus 400 in FIG. 4.

A control circuit 1047 controls a differential polarization delay, which retards one polarization relatively to the other, so that the delay between the polarizations is maintained to k/2 symbols, as it is, when emitted by the transmitter, which emitted the signal 1012. The retard of the X polarization by k/2 symbols is necessary for the optical process, and it is eventually corrected by a buffer of two symbols in the serializer and coder 1038 after the polarizations X and Y have been identified. The link skew between polarizations X and Y has been compensated by the receiver using the monitoring information of the present invention, so that the data 1012 has been correctly received and converted into the data 1013. In addition, the present invention enabled to control the optical polarization demultiplexing scheme.

Figure 11:
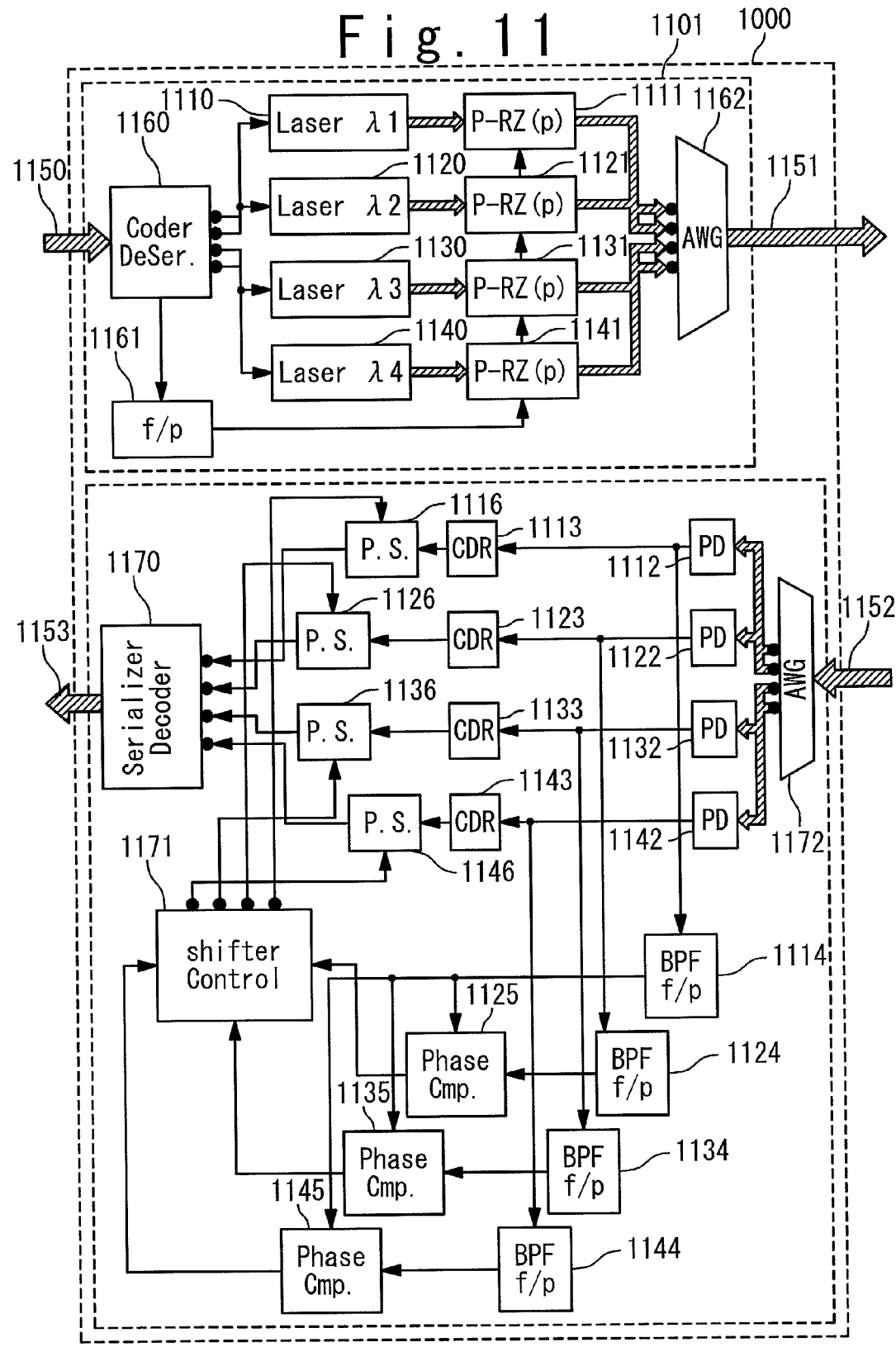
FIG. 11 is a schematic representation of a transponder emitting and receiving wavelength division multiplexed signals and implementing the invention.

In another exemplary embodiment, the present invention is incorporated in the transponder described on FIG. 11. A WDM transponder 1100 incorporates the present invention. The transponder 1100 has an optical transmitter 1101, which transmits a high bit rate data stream 1150 on four parallel signals at four different wavelengths and, whose bit rate are four time lower than the stream 1150. The transponder 1100 has an optical receiver, which receives four parallel signals of four different wavelengths emitted by a transmitter similar to the transmitter 1101, and serializes them into a serial data stream 1153. A signal 1151 represents the four parallel WDM signals emitted by the transmitter 1101. A signal 1152 represents the four parallel WDM signals received by a receiver 1102. The bit rates of the stream signals 1150 and 1153 are equal.

A coder and de-serializer 1160 splits the stream signal 1150 into four parallel signals, which are sent to modulator integrated lasers 1110, 1120, 1130 and 1140. Each of the lasers emits a wavelength NRZ intensity modulated signal at a distinct wavelength. A clock signal of the frequency f (one fourth of the bit rate of the de-serializer 1160) is frequency divided by p by a frequency divider 1161 (four instance p=4), and the clock signal of the frequency f/p is distributed to four P-RZ(p) carver similar to the carver 100 of FIG. 1. The P-RZ carvers are noted 1111, 1121, 1131 and 1141. A wavelength multiplexer 1162 is used to combine the four P-RZ(4) intensity modulated signals into the signal 1151.

A wavelength de-multiplexer 1172 separates the four wavelengths of the signal 1152 into four monochromatic signals. The four signals are received by photodiodes 1112, 1122, 1132 and 1142. The electrical signals generated by the photodiodes through the photoelectrical conversion of the parallel optical wavelengths of the signal 1152. Each of the four electrical signals is split. Clock and data recovery (CDR) units 1113, 1123, 1133 and 1143 decode split parts of the electrical signals, and band pass filter 1114 centered on the frequency f/p filters the other split part of the electrical signal converted by the photodiode 1112. Therefore, the clock signal of the frequency f/p at the output of the band pass filter contains the information of the P-RZ(4) carving. The filters 1124, 1134 and 1144 are identical to the filter 1114 and operate in the same way to the signals from the respective photodiodes 1122, 1132 and 1142. Phase comparators 1125, 1135 and 1145 are identical to the comparator 400 in FIG. 4 and compare the clock signal 1114 and the respective clock signals 1124, 1134 and 1144 in phase. The electrical signals proportional to the phase delays between the clock signals are generated by the phase comparators 1124, 1134 and 1144 and sent to a phase shifter control unit 1171. The phase shifter control unit 1171 generates four electrical signals to control the four variable phase shifters 1116, 1126, 1136 and 1146, which are placed on the path of the data received by the respective photodiodes 1112, 1122, 1132 and 1142. The control unit 1171 controls the phase shifters 1116, 1126, 1136, 1146 to compensate the skews between the four received wavelengths, which are monitored through the phase delay between the clock signals of the frequency f/p generated through the four band pass filters. The control unit 1171 is calibrated so that the four phase shifters introduce the same delay when the four received wavelength have no skew. The serializer and decoder 1170 transform the four parallel signals with compensated skew into the serial signal 1153.

The link skew between the four wavelengths has been compensated by the receiver using the monitoring information of the present invention, so that the data signal 1152 has been correctly received and converted into the data stream 1153.

Figure 12:
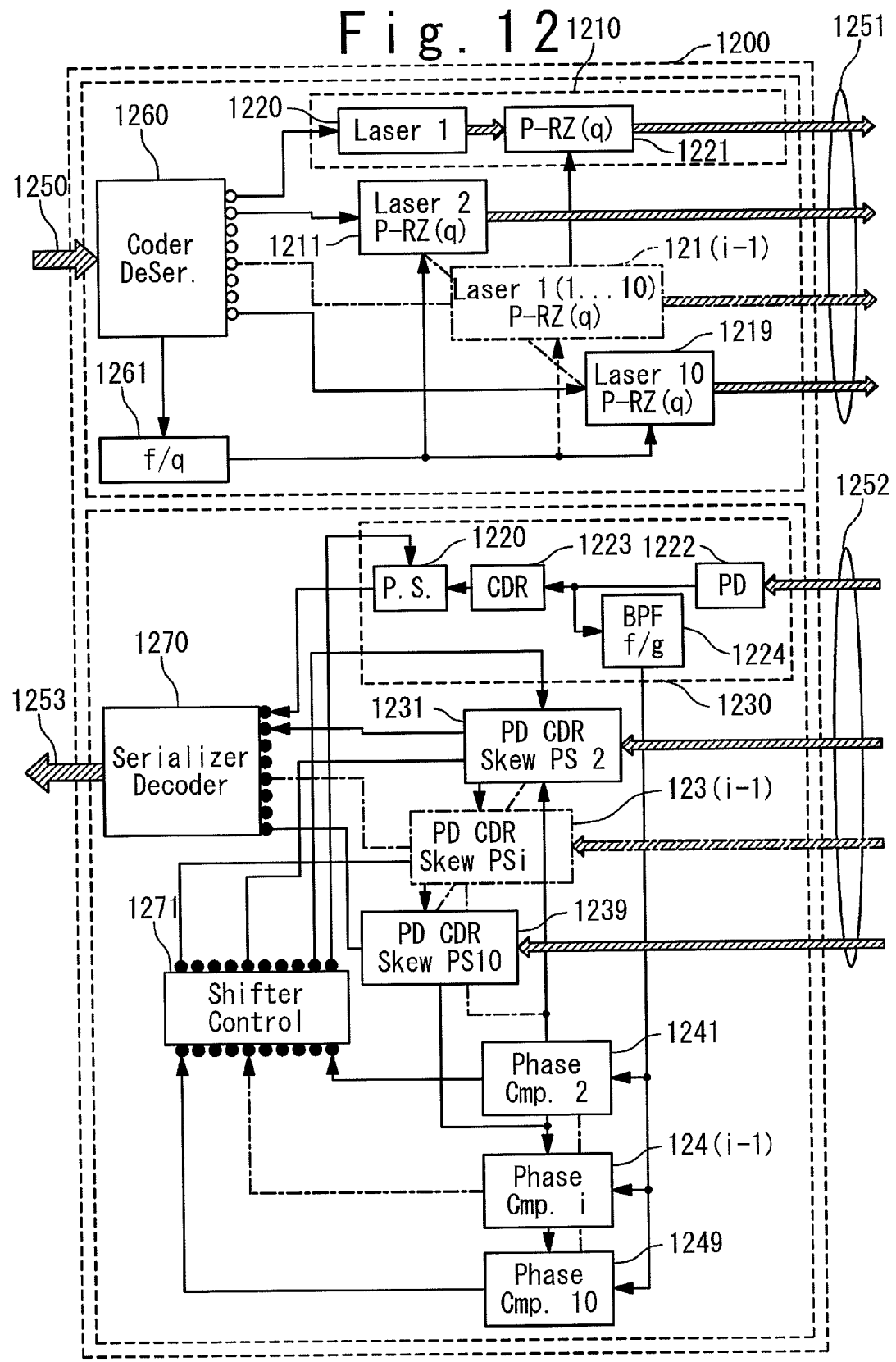
FIG. 12 is a schematic representation of a transponder emitting and receiving space division multiplexed signals and implementing the invention.

In another exemplary embodiment, the present invention is incorporated in the transponder shown in FIG. 12. A SDM transponder 1200 incorporates the present invention. The transponder 1200 has an optical transmitter 1201, which transmits a high bit rate data stream 1250 on ten parallel signals, whose bit rate are ten times lower than the signal 1250, through ten different fibers which are attached in the fiber ribbon 1251. The transponder 1200 has an optical receiver, which receives ten parallel signals of fibers attached with the fiber ribbon 1252 and emitted by a transmitter similar to the transmitter 1201. The receiver 1202 serializes them into the serial data stream 1253. The bit rates of the signals 1250 and 1253 are equal to each other. The bit rate of the parallel signals transmitted in the fiber ribbon 1251 is equal to the bit rate of the parallel signals transmitted in the fiber ribbon 1252, and is one tenth of the bit rate of the signal 1250.

The coder and de-serializer 1260 splits the signal 1250 into ten parallel signals. An emitter 1210 is composed of a laser, whose optical intensity is modulated with one of the parallel signals from the coder 1260, and a P-RZ(q) carver 1221. A frequency divider 1261 transforms a clock data of the frequency f (one tenth of the bit rate of the signal 1250) into a clock signal at the frequency f/q, which is fed to the P-RZ(q) carver 1221. The emitter 1210 emits one light signal according to the parallel signal from the coder 1260 into the fiber ribbon 1251. The nine other emitters noted by consecutive numbers from 1211 to 1219 are identical to the emitter 1210, and transmits nine parallel intensity modulated P-RZ(q) signals containing the information of the nine other parallel signals from the coder 1260 into the nine remaining fibers of the ribbon 1251.

A skew compensation receiver unit 1230 is composed of a photodiode 1222, a CDR 1223, a band pass filter 1224 centered on the frequency f/q and a variable phase shifter 1225. The photodiode 1222 converts the light signal from one of the fibers of the signal 1252 into an electrical signal, which is split in two signals. One signal is send to the CDR 1223 to be converted to electrical data, and the other signal is filtered by the filter 1224 to generate a clock signal of the frequency f/q containing the harmonic of the frequency f/q of the P-RZ(q) light signal. The phase shifter 1225 shifts the data after the CDR 1223 and is control by a control unit 1271. The other nine parallel signals transmitted by the fiber ribbon 1252 are received by the nine skew compensation receivers noted by nine consecutive numbers from skew compensation receiver units 1231 to 1239, which are identical to the receiver unit 1230.

The nine phase comparators noted from 1241 to 1249 compare in phase, the clock signal of the frequency f/q emitted by the receiver unit 1230 and the respective clock signals coming from the skew compensation receiver units 1231 to 1249. The electrical signals proportional to the phase delay between the clock signals are generated by the nine phase comparators 1241 to 1249 and sent to the phase shifter control unit 1271. The phase shifter control unit 1271 generates ten electrical signals to control the ten phase shifters 1225, ... of the receiver units 1230 to 1239. The control unit 1271 controls the phase shifters to compensate the skew between the ten received signals, which are monitored through the phase delays between the clock signals of the frequency f/q generated by the band pass filters of the receiver units 1230 to 1239. The control unit 1271 is calibrated so that the ten shifters introduce a same delay when the ten received parallel signals have no skew. The serializer and decoder 1270 transform the ten parallel signals with compensated skew into the serial signal 1253.

The link skew between the ten parallel signals has been compensated by the receiver using the monitoring information of the present invention, so the data 1252 has been correctly received and converted into the data 1253.

Figure 13:
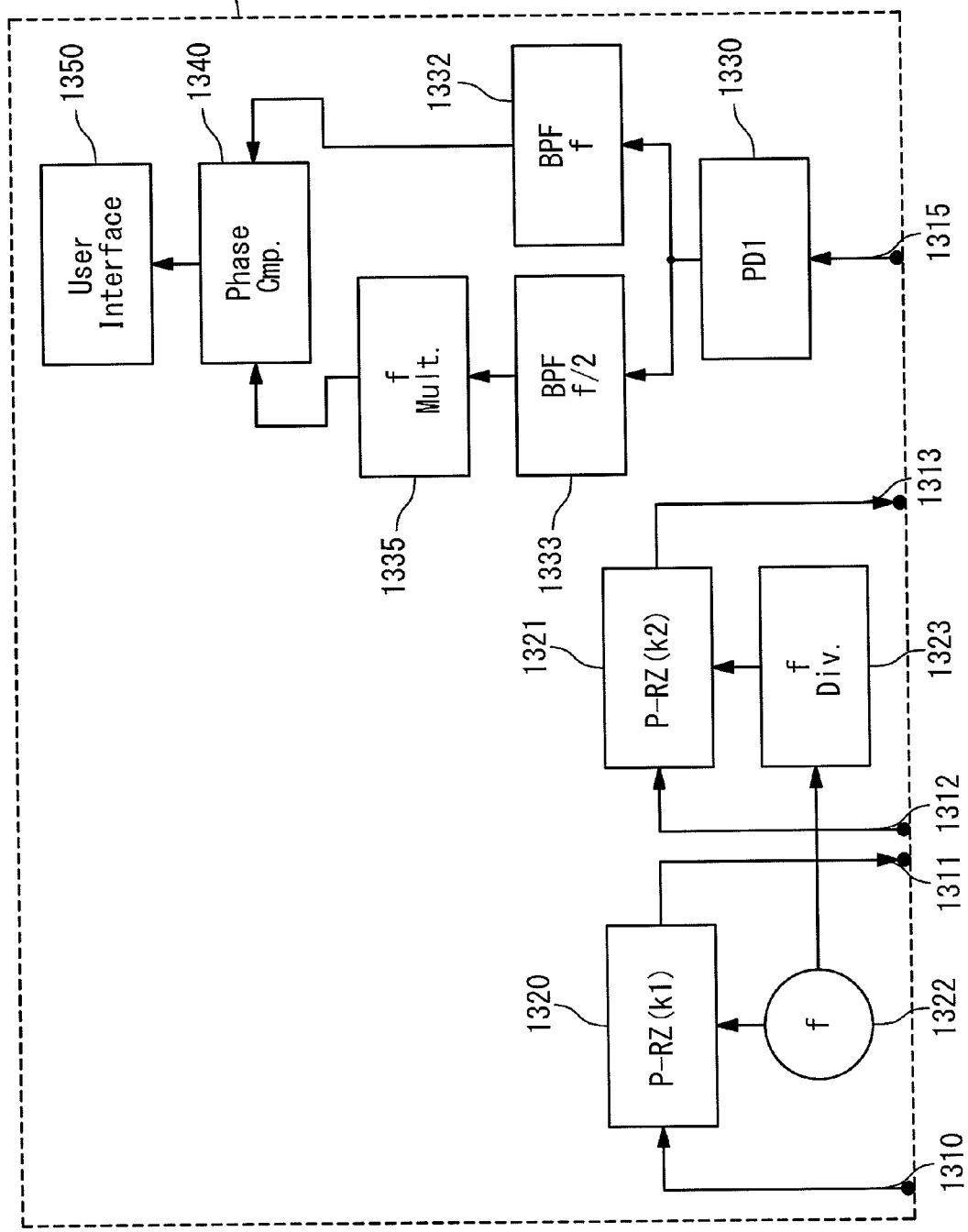
FIG. 13 is a schematic representation of a measurement instrument implementing the invention.

In another embodiment, the present invention is implemented in the measurement instrument 1300 illustrated in FIG. 13. 1310, 1312 and 1315 denote optical input interfaces. 1311 and 1313 denote optical output interfaces. An electrical generator 1322 generates a clock signal of the frequency f. The P-RZ(k1) carver 1320 imprints P-RZ dips to the signal input on the interface 1310 according to the clock signal from the generator 1322. A frequency divider 1323 converts the clock signal of the frequency f into a clock signal of the frequency f/2 and imprints P-RZ dips with the carver 1321 on an light signal input at the interface 1312. A delay between the interfaces 1310 and 1311 is designed and adjusted to be equal to the delay between the interfaces 1312 and 1313. The photodiode 1330 converts the light signal input at the interface 1315 into an electrical signal split to be filtered by the two band pass filters 1332 and 1333, centered respectively on the frequencies f and f/2. A frequency doubler 1335 converts the clock signal of the output of the filter 1333 into a clock signal of the same frequency as the one at the output of the filter 1332. A phase comparator 1340 measures the delay between the clock signals from the filter 1332 and the frequency doubler 1335. The result of the phase comparison is displayed and saved on a medium by an interface 1350.

Next, an example of operation of 1300 will be described. The instrument 1300 is used to measure the slew between the polarizations in the transmitter 600. The modulators 631 and 632, as well as the carvers 633 and 634 are turned off, so that the output signal of the transmitter 600 is constant. The output fiber 602 is connected to the interface 1310, and the interface 1311 is connected to the input fiber 601. The output fiber 602 is connected to the interface 1312, and the interface 1313 is connected to the input fiber 601. The output fiber of the transmitter 600 is connected to 1315. The carvers 1320 and 1321 imprint P-RZ dips on the two polarizations of the transmitter 600. Two clock signals of the frequencies f and f/2 containing the information of the two imprinted P-RZ dips are generated through the carvers 1332 and 1333. The clock frequency of the frequency f/2 is doubled by the frequency doubler 1335 and the two clock signals of the frequency f are compared by the phase comparator 1340. The measured phase delay expresses the delay between the P-RZ dips, and therefore the skew between the polarizations. A user interface 1350 displays and saves to a medium the skew measured between the multiplexed polarizations in the transmitter 600. By adjusting the fiber length or introducing a variable delay line, the skew at the output of the transmitter 600 can be set to zero after several measurements. The maximum measurable skew is 2/f. For instance, if f=1 GHz, the maximum measurable skew is 2 ns.

As described above, according to the present invention, various advantages can be obtained. Also, the above embodiments or examples may be combined a case of no contradiction.

While the present invention has been particularly shown and described with reference to the exemplary embodiments thereof, the present invention is not limited to these exemplary embodiments. It will be understood by those of ordinary skill in the art that various changes in form and details may be made therein without departing from the spirit and scope of the present invention as defined by the claims.

The invention claimed is:

1. A method comprising:
   imprinting dips on an optical amplitude of parallel signals;
   modulating each of said parallel signals to carry respective temporal sequence of data symbols;
   extracting an electrical signal containing information of the imprinted dips, for each of the parallel signals; and
   comparing the extracted electrical signals to detect a skew between the parallel signals;
   wherein imprinted dips and modulated symbols are synchronized so that:
      each dip is imprinted on the optical amplitude between two consecutive symbols;
      each dip has a duration so that the dip does not affect a central part of each of two consecutive symbols between which the dip is imprinted; and
      the dips are imprinted on the optical amplitude of each signal at a regular interval.

2. The method according to claim 1, wherein the dips are imprinted at different regular intervals on the different parallel signals, respectively.

3. The method according to claim 2, wherein the different regular intervals for the dips are used to distinguish the parallel signals.

4. The method according to claim 1, wherein the dips are imprinted at the same regular interval on each of the parallel signals and the electrical signals are extracted for the parallel signals.

5. The method according to claim 1, wherein the frequency at which the dips are imprinted on the optical amplitude can be changed during the monitoring.

6. The method according to claim 1, wherein a clock signal is generated from the extracted electrical signals.

7. The method according to claim 1, wherein the parallel signals are polarization multiplexed signals.

8. The method according to claim 7, wherein a clock signal is generated from the extracted electrical signal.

9. The method according to claim 1, wherein the parallel signals are wavelength division multiplexed signals.

10. The method according to claim 1, wherein the parallel signals are space division multiplex signals.

11. A monitoring system to monitor a skew between parallel signals carrying information of a serial light signal converted to parallel signals including:
    a carver configured to imprint dips on optical amplitude of each of parallel light signals;
    a modulator configured to modulate each of the parallel light signals to carry a respective temporal sequence of data symbols;
    a converter configured to convert the parallel light signals into electrical signals;
    an extractor configured to extract the electrical signals containing information of the imprinted dips for each of the parallel signals; and
    a comparator configured to detect a skew between the extracted electrical signals;
    wherein said carver and modulator are synchronized so that:
       each dip is imprinted on the optical amplitude between two consecutive symbols;
       each dip has a duration so that the dip does not affect a central part of each of two consecutive symbols between which the dip is imprinted; and
       the dips are imprinted on the optical amplitude of each signal at a regular interval.

12. The monitoring system according to claim 11, wherein said carver is further configured to imprint the dips at different regular intervals on the different parallel signals.

13. The monitoring system according to claim 11, further comprising:
    a splitter configured to separate the serial light signal into the parallel light signals.

14. A transponder comprising:
    a monitoring system to monitor a skew between parallel signals carrying information of a serial light signal converted to parallel signals, wherein the serial light signal is a polarization multiplexed light signal; and
    a skew compensation unit, wherein the monitoring system includes:
       a carver configured to imprint dips on optical amplitude of each of parallel light signals;
       a modulator configured to modulate each of the parallel light signals to carry a respective temporal sequence of data symbols;
       a converter configured to convert the parallel light signals into electrical signals;
       an extractor configured to extract the electrical signals containing information of the imprinted dips for each of the parallel signals; and
       a comparator configured to detect a skew between the extracted electrical signals, and
    the skew compensation unit is configured to compensate a skew between polarizations corresponding to the parallel light signals based on the detected skew;

wherein said carver and modulator are synchronized so that:
- each dip is imprinted on the optical amplitude between two consecutive symbols;
- each dip has a duration so that the dip does not affect a central part of each of two consecutive symbols between which the dip is imprinted; and
- the dips are imprinted on the optical amplitude of each signal at a regular interval.

15. The transponder according to claim 14, wherein said monitoring system further comprises:
a splitter configured to separate the serial light signal into the parallel light signals.

16. The transponder according to claim 15, further comprising:
a unit configured to generate a clock signal from the electrical signals and control said splitter to separate the serial light signal into the parallel light signals based on the clock signal.

17. The transponder according to claim 15, wherein said monitoring system further comprises:
- an optical reception unit configured to receive and digitalize a polarization multiplexed light signal as the serial light signal; and
- a processing unit to retrieve the information of the dips imprinted on the parallel light signals, and
- said comparator calculates the skew between the extracted electrical signals by using the information.

18. The transponder according to claim 14, wherein the carver is further configured to imprint dips at different intervals on the optical amplitude for each multiplexed polarization.

19. A transponder comprising:
- a monitoring system to monitor a skew between parallel signals carrying information of a serial light signal converted to parallel signals, wherein the serial light signal is a wavelength division multiplexed light signal; and
- a skew compensation unit, wherein the monitoring system includes:
- a carver configured to imprint dips on optical amplitude of each of parallel light signals;
- a modulator configured to modulate each of the parallel light signals to carry a respective temporal sequence of data symbols;
- a converter configured to convert the parallel light signals into electrical signals;
- an extractor configured to extract the electrical signals containing information of the imprinted dips for each of the parallel signals; and
- a comparator configured to detect a skew between the extracted electrical signals, and
- the skew compensation unit is configured to compensate a skew between wavelengths corresponding to the parallel light signals based on the detected skew;

wherein said carver and modulator are synchronized so that:
- each dip is imprinted on the optical amplitude between two consecutive symbols;
- each dip has a duration so that the dip does not affect a central part of each of two consecutive symbols between which the dip is imprinted; and
- the dips are imprinted on the optical amplitude of each signal at a regular interval.

20. A transponder including:
- a monitoring system to monitor a skew between parallel signals carrying information of a serial light signal converted to parallel signals, wherein the serial light signal is a space division multiplexed light signal; and
- a skew compensation unit, wherein the monitoring system includes:
- a carver configured to imprint dips on optical amplitude of each of parallel light signals;
- a modulator configured to modulate each of the parallel light signals to carry a respective temporal sequence of data symbols;
- a converter configured to convert the parallel light signals into electrical signals;
- an extractor configured to extract the electrical signals containing information of the imprinted dips for each of the parallel signals; and
- a comparator configured to detect a skew between the extracted electrical signals, and
- the skew compensation unit is configured to compensate a skew between channels corresponding to the parallel light signals based on the detected skew;

wherein said carver and modulator are synchronized so that:
- each dip is imprinted on the optical amplitude between two consecutive symbols;
- each dip has a duration so that the dip does not affect a central part of each of two consecutive symbols between which the dip is imprinted; and
- the dips are imprinted on the optical amplitude of each signal at a regular interval.

\* \* \* \* \*